US012389898B2

(12) United States Patent
Anderson et al.

(10) Patent No.: US 12,389,898 B2
(45) Date of Patent: Aug. 19, 2025

(54) AUTOMATED NOZZLE ADJUSTMENTS FOR PLANT TREATMENT APPLICATION

(71) Applicant: Deere & Company, Moline, IL (US)

(72) Inventors: Kent Michael Anderson, Signal Mountain, TN (US); Benjamin Ray Chostner, San Francisco, CA (US); Bryon William Majusiak, Incline Village, NV (US)

(73) Assignee: Deere & Company, Moline, IL (US)

( * ) Notice: Subject to any disclaimer, the term of this patent is extended or adjusted under 35 U.S.C. 154(b) by 599 days.

(21) Appl. No.: 17/665,322

(22) Filed: Feb. 4, 2022

(65) Prior Publication Data

US 2022/0248655 A1     Aug. 11, 2022

Related U.S. Application Data

(60) Provisional application No. 63/146,433, filed on Feb. 5, 2021.

(51) Int. Cl.
*A01M 7/00* (2006.01)
*A01C 23/04* (2006.01)

(52) U.S. Cl.
CPC .......... *A01M 7/006* (2013.01); *A01C 23/047* (2013.01); *A01M 7/0089* (2013.01)

(58) Field of Classification Search
CPC .... A01M 7/006; A01M 7/0089; A01C 23/047
USPC ....................................................... 239/159
See application file for complete search history.

(56) References Cited

U.S. PATENT DOCUMENTS

| | | | | |
|---|---|---|---|---|
| 6,193,166 B1 * | 2/2001 | Miller | ................... | A01M 7/006 239/574 |
| 6,325,302 B1 * | 12/2001 | Guzowski | ................ | B05B 1/14 239/128 |
| 6,444,090 B1 * | 9/2002 | Wolf | ....................... | D21G 7/00 118/325 |
| 6,596,996 B1 * | 7/2003 | Stone | ................. | G01N 21/4738 250/341.1 |
| 6,675,988 B2 * | 1/2004 | Cline | ..................... | B29B 7/325 222/639 |
| 10,192,185 B2 * | 1/2019 | Tomii | .................... | G06Q 50/02 |
| 2014/0138456 A1 * | 5/2014 | Lev | .................... | H04N 1/00472 239/11 |
| 2015/0367358 A1 * | 12/2015 | Funseth | ................. | A01G 25/16 239/562 |

* cited by examiner

*Primary Examiner* — Chee-Chong Lee
(74) *Attorney, Agent, or Firm* — Fenwick & West LLP

(57) ABSTRACT

A treatment mechanism for dispensing treatment fluid onto one or more plants in a field is described. The treatment mechanism includes a valve for regulating the dispensing of treatment fluid and a nozzle holder comprising a plurality of nozzles. Each nozzle is configured to dispense treatment fluid and to couple to the valve. The treatment mechanism further includes a control system configured to receive a plant treatment instruction for treating the plants. The plant treatment instruction includes a treatment position for the nozzle holder. The control system is further configured to determine a current position of the nozzle holder and adjust the current position of the nozzle holder to the treatment position for the nozzle holder. The control system is further configured to actuate the treatment mechanism such that the plants are treated via a nozzle of the plurality of nozzles.

15 Claims, 13 Drawing Sheets

AUTOMATED NOZZLE ADJUSTMENTS FOR PLANT TREATMENT APPLICATION

CROSS-REFERENCE TO RELATED APPLICATION

This application claims the benefit of priority to U.S. Provisional Patent Application No. 63/146,433, filed on Feb. 5, 2021, which is incorporated by reference in its entirety.

BACKGROUND

Field of Disclosure

This disclosure relates to a system for applying treatment fluid to plants in a field, and more specifically to automatically adjusting nozzles for dispensing treatment fluid.

Description of the Related Art

Current methods for spraying plant treatment (e.g., herbicide treatment, fungicide treatment, etc.) on plants in a field utilize high-density spray nozzles. Each spray nozzle in the spray system is uniform. Over time nozzles wear-out and need to be replaced. Additionally, nozzles must be replaced for different types of application of plant treatment (e.g., broadcast application, spot spraying, etc.). Typically, swapping and/or replacing the nozzles is a large manual burden and can suffer from human error.

SUMMARY

A farming machine is configured to move through a field and treat one or more plants in the field using various treatment mechanisms. A treatment mechanism may include a plurality of nozzle holders with each nozzle holder of the plurality of nozzle holders including a plurality of nozzles. Each nozzle is configured to couple to a valve and to dispense treatment fluid. The valve is configured to regulate the dispensing of treatment fluid. One or more nozzle holders may be automatically adjusted (e.g., the positioning of one or more nozzle holders may be adjusted) based on plant treatment instructions. In some embodiments, the plant treatment instructions include a treatment position for a nozzle holder. The treatment mechanism determines a current position of the nozzle holder and adjusts the position of the nozzle holder from the current position to the treatment position. In some embodiments, the treatment mechanism may determine one or more nozzles of the plurality of nozzles are unable to dispense treatment fluid (e.g., are blocked, clogged, or worn out). Based on this determination, the treatment mechanism may adjust the position of one or more nozzle holders such that operable nozzles are coupled to the valve.

In some embodiments, a farming machine is described for treating one or more plants in a field. The farming machine comprises a treatment mechanism configured to dispense treatment fluid to one or more plants as the farming machine travels past the plants in a field. The treatment mechanism comprises a valve for regulating the dispensing of treatment fluid, a nozzle holder comprising a plurality of nozzles, and a control system. Each nozzle is configured to dispense treatment fluid and to couple to the valve. The control system is configured to receive a plant treatment instruction for treating the plants. The plant treatment instruction comprises a treatment position for a nozzle holder. The treatment position for a nozzle holder is a position of the nozzle holder which enables the farming machine to provide the treatment corresponding to the treatment instruction. That is, in the treatment position the nozzle holder couples a nozzle that will apply the desired treatment to the valve. Additionally, each nozzle in a nozzle holder corresponds to a position of the nozzle holder that couples it to the valve. Each position may be a treatment position when the treatment instruction is for its corresponding nozzle.

The control system is further configured to determine a current position of the nozzle holder in the treatment mechanism. The control system determines the current position of the nozzle holder by receiving a magnetic field measurement produced by one or more magnets positioned in the nozzle holder and identifying the current position of the nozzle holder based on the measurement of the magnetic field. The control system is further configured to automatically adjust the current position of the nozzle holder to the treatment position for the nozzle holder. The control system is further configured to actuate, based on the plant treatment instruction, the treatment mechanism such that the plants are treated via a nozzle while the nozzle holder is in the treatment position as the farming machine moves past the plants in the field.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

I. Farming Machine

Figure 1A:
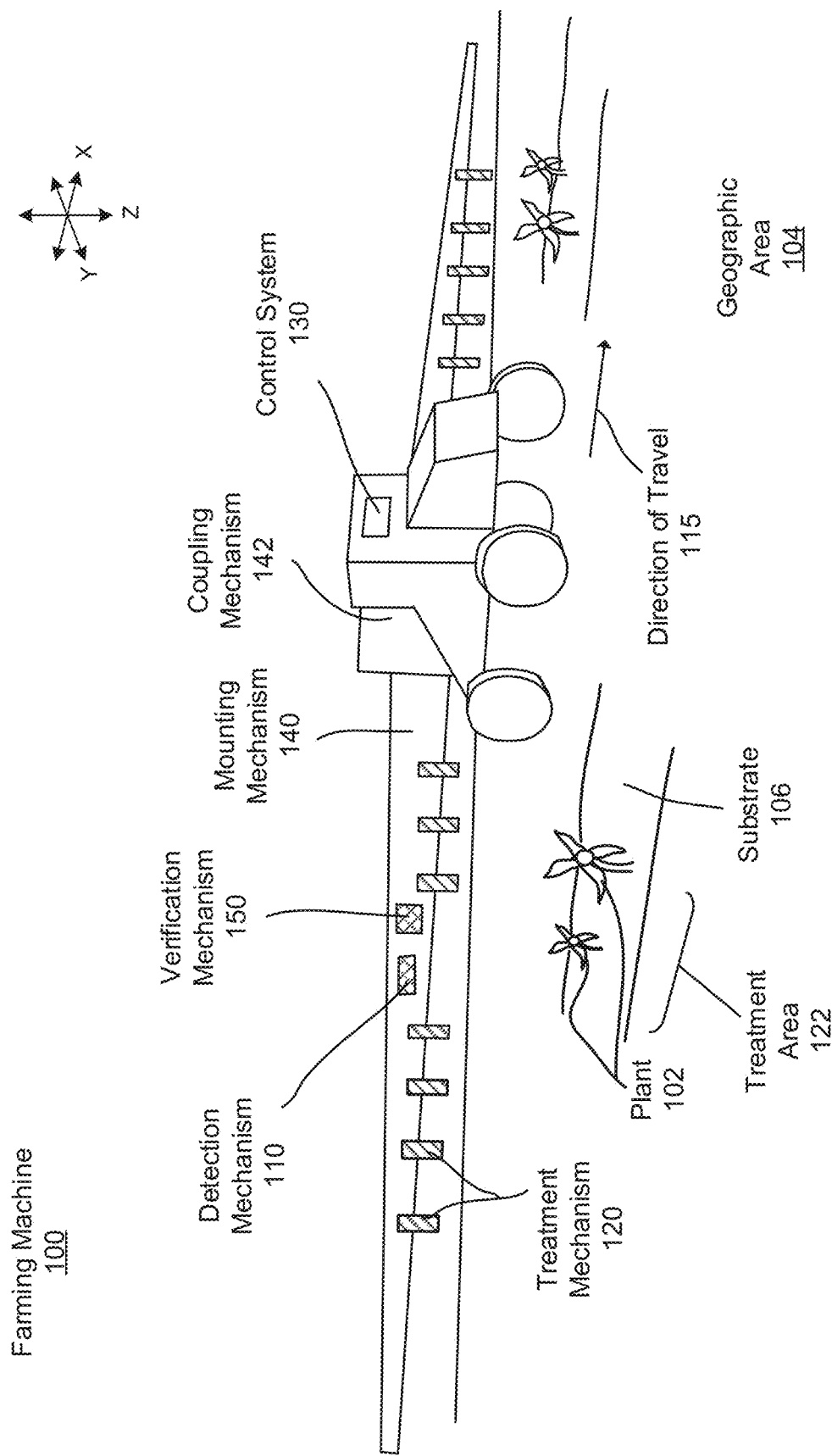
FIG. 1A illustrates an isometric view of a farming machine, in accordance with an example embodiment.
Figure 1B:
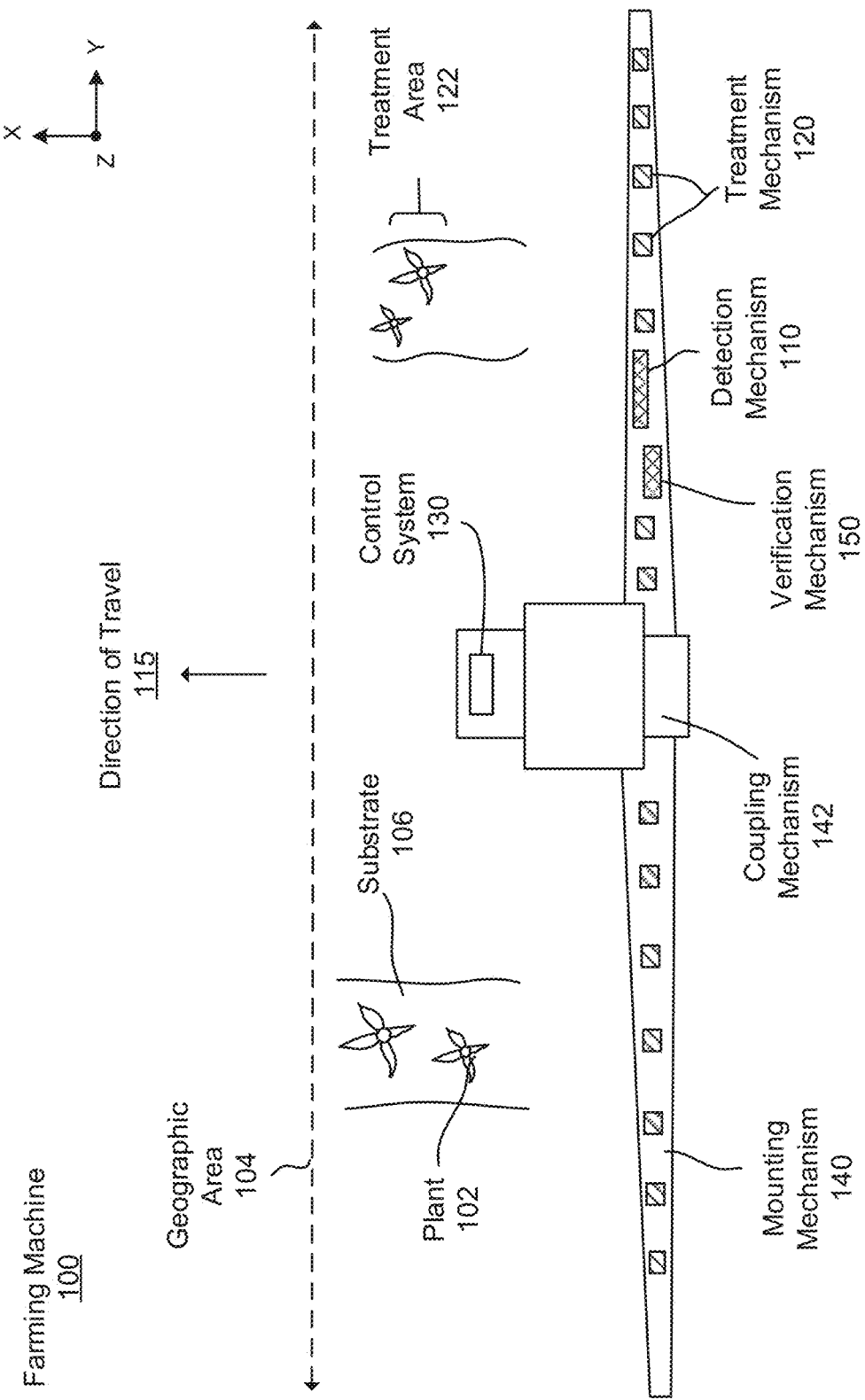
FIG. 1B illustrates a top view of the farming machine, in accordance with the example embodiment.
Figure 1C:
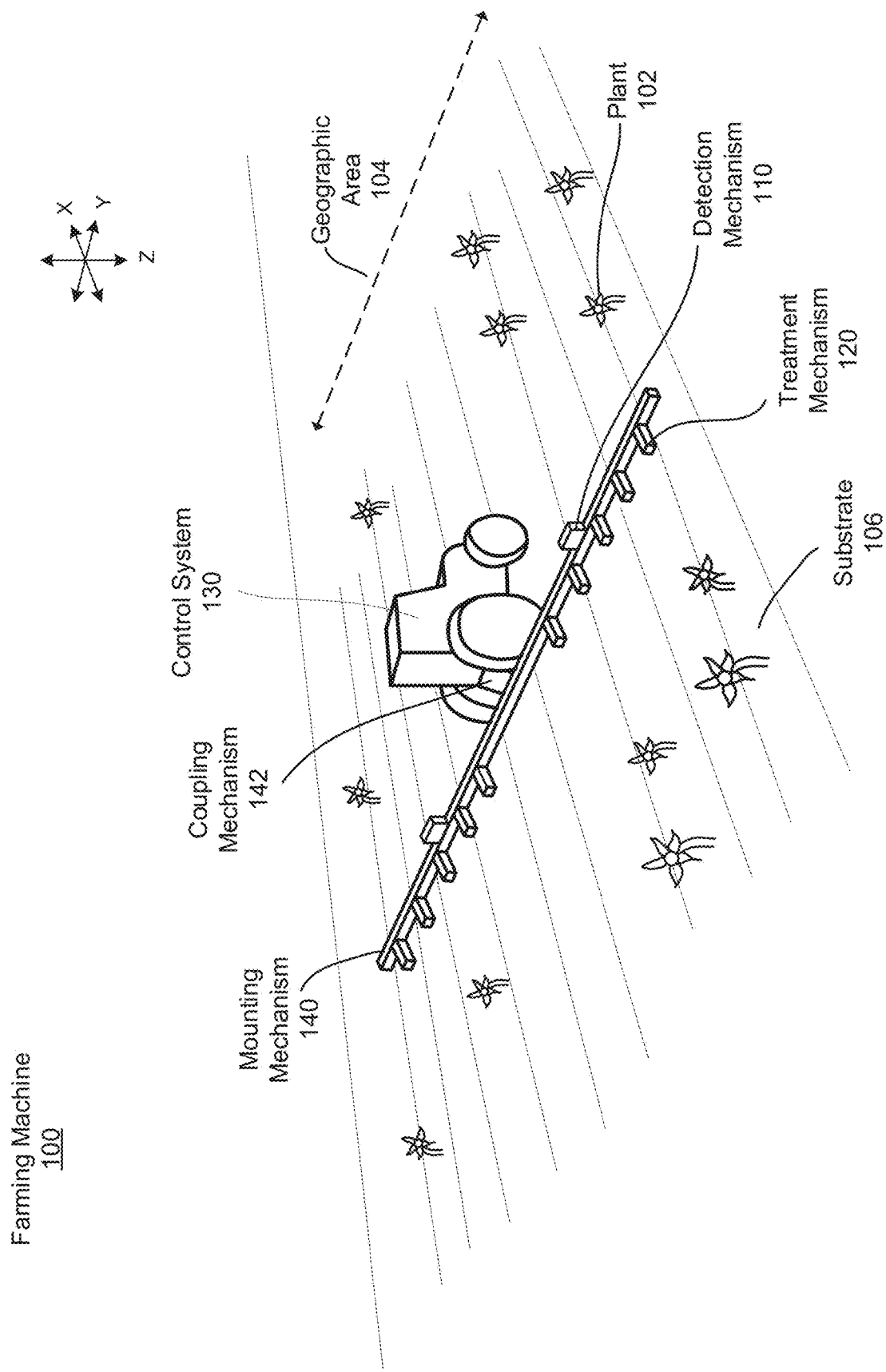
FIG. 1C illustrates an isometric view of a farming machine, in accordance with a second example embodiment.

A farming machine that identifies and treats plants may have a variety of configurations, some of which are described in greater detail below. For example, FIG. 1A is an isometric view of a farming machine and FIG. 1B is a top view of the farming machine of FIG. 1A. FIG. 1C is a second embodiment of a farming machine. Other embodiments of a farming machine are also possible. The farming machine 100, illustrated in FIGS. 1A-1C, includes a detection mechanism 110, a treatment mechanism 120, and a control system 130. The farming machine 100 can additionally include a mounting mechanism 140, a verification mechanism 150, a power source, digital memory, communication apparatus, or any other suitable component. The farming machine 100 can include additional or fewer components than described herein. Furthermore, the components of the farming machine 100 can have different or additional functions than described below.

The farming machine 100 functions to apply a treatment to one or more plants 102 within a geographic area 104. Often, treatments function to regulate plant growth. The treatment is directly applied to a single plant 102 (e.g., hygroscopic material), but can alternatively be directly applied to multiple plants, indirectly applied to one or more plants, applied to the environment associated with the plant (e.g., soil, atmosphere, or other suitable portion of the plant environment adjacent to or connected by an environmental factor, such as wind), or otherwise applied to the plants. Treatments that can be applied include necrosing the plant, necrosing a portion of the plant (e.g., pruning), regulating plant growth, or any other suitable plant treatment. Necrosing the plant can include dislodging the plant from the supporting substrate 106, incinerating a portion of the plant, applying a treatment concentration of treatment fluid (e.g., fertilizer, hormone, water, etc.) to the plant, or treating the plant in any other suitable manner. Regulating plant growth can include promoting plant growth, promoting growth of a plant portion, hindering (e.g., retarding) plant or plant portion growth, or otherwise controlling plant growth. Examples of regulating plant growth includes applying growth hormone to the plant, applying fertilizer to the plant or substrate, applying a disease treatment or insect treatment to the plant, electrically stimulating the plant, watering the plant, pruning the plant, or otherwise treating the plant. Plant growth can additionally be regulated by pruning, necrosing, or otherwise treating the plants adjacent to the plant.

The plants 102 can be crops but can alternatively be weeds or any other suitable plant. The crop may be cotton, but can alternatively be lettuce, soybeans, rice, carrots, tomatoes, corn, broccoli, cabbage, potatoes, wheat or any other suitable commercial crop. The plant field in which the system is used is an outdoor plant field, but can alternatively be plants within a greenhouse, a laboratory, a grow house, a set of containers, a machine, or any other suitable environment. The plants are grown in one or more plant rows (e.g., plant beds), wherein the plant rows are parallel, but can alternatively be grown in a set of plant pots, wherein the plant pots can be ordered into rows or matrices or be randomly distributed, or be grown in any other suitable configuration. The crop rows are generally spaced between 2 inches and 45 inches apart (e.g. as determined from the longitudinal row axis), but can alternatively be spaced any suitable distance apart, or have variable spacing between multiple rows.

The plants 102 within each plant field, plant row, or plant field subdivision generally includes the same type of crop (e.g., same genus, same species, etc.), but can alternatively include multiple crops (e.g., a first and a second crop), both of which are to be treated. Each plant 102 can include a stem, arranged superior (e.g., above) the substrate 106, which supports the branches, leaves, and fruits of the plant. Each plant can additionally include a root system joined to the stem, located inferior to the substrate plane (e.g., below ground), that supports the plant position and absorbs nutrients and water from the substrate 106. The plant can be a vascular plant, non-vascular plant, ligneous plant, herbaceous plant, or be any suitable type of plant. The plant can have a single stem, multiple stems, or any number of stems. The plant can have a tap root system or a fibrous root system. The substrate 106 is soil but can alternatively be a sponge or any other suitable substrate.

The detection mechanism 110 is configured to identify a plant for treatment. As such, the detection mechanism 110 can include one or more sensors for identifying a plant. For example, the detection mechanism 110 can include a multispectral camera, a stereo camera, a CCD camera, a single lens camera, a CMOS camera, hyperspectral imaging system, LIDAR system (light detection and ranging system), a depth sensing system, dynamometer, IR camera, thermal camera, humidity sensor, light sensor, temperature sensor, or any other suitable sensor. In some example systems, the detection mechanism 110 is mounted to the mounting mechanism 140, such that the detection mechanism 110 traverses over a geographic location before the treatment mechanism 120 as the farming machine 100 moves through the geographic location. However, in some embodiments, the detection mechanism 110 traverses over a geographic location at substantially the same time as the treatment mechanism 120. In an embodiment of the farming machine 100, the detection mechanism 110 is statically mounted to the mounting mechanism 140 proximal the treatment mechanism 120 relative to the direction of travel 115. In other systems, the detection mechanism 110 can be incorporated into any other component of the farming machine 100.

The treatment mechanism 120 functions to apply a treatment to one or more plants 102. The treatment mechanism 120 applies the treatment to the treatment area 122 as the farming machine 100 moves in a direction of travel 115. The effect of the treatment can include plant necrosis, plant growth stimulation, plant portion necrosis or removal, plant portion growth stimulation, or any other suitable treatment effect as described above. The treatment can include plant 102 dislodgement from the substrate 106, severing the plant (e.g., cutting), plant incineration, electrical stimulation of the plant, fertilizer or growth hormone application to the plant, watering the plant, light or other radiation application to the plant, injecting one or more treatment fluids into the substrate 106 adjacent the plant (e.g., within a threshold distance from the plant), or otherwise treating the plant. In one embodiment, the treatment mechanisms 120 are an array of spray treatment mechanisms. The treatment mechanisms 120 may be configured to spray one or more treatment fluids including an herbicide, a fungicide, water, a pesticide, another treatment fluid, or a combination thereof. The treatment mechanism 120 is operable between a standby mode, wherein the treatment mechanism 120 does not apply a treatment, and a treatment mode, wherein the treatment mechanism 120 is controlled by the control system 130 to apply the treatment. However, the treatment mechanism 120 can be operable in any other suitable number of operation modes.

The farming machine 100 may include one or more treatment mechanisms 120. A treatment mechanism 120 may be fixed (e.g., statically coupled) to the mounting mechanism 140 or attached to the farming machine 100 relative to the detection mechanism 110. Alternatively, the treatment mechanism 120 can rotate or translate relative to the detection mechanism 110 and/or mounting mechanism 140. In one variation, the farming machine 100 includes a single treatment mechanism, wherein the treatment mechanism 120 is actuated or the farming machine 100 is moved to align the treatment mechanism 120 with the treatment area 122. In a second variation, the farming machine 100 includes an assembly of treatment mechanisms, wherein a treatment mechanism 120 (or subcomponent of the treatment mechanism 120) of the assembly is selected to apply the treatment to the plant 102 or portion of a plant in response to the plant position relative to the assembly. In a third variation, such as shown in FIGS. 1A-1C, the farming machine 100 includes an array of treatment mechanisms 120, wherein the treatment mechanisms 120 are actuated or the farming machine 100 is moved to align the treatment mechanism 120 with the treatment areas 122 with the targeted plant 102 or plant segment.

The components and operation of the treatment mechanism 120 are described in greater detail below in relation to FIGS. 2-6.

The farming machine 100 includes a control system 130 for controlling operations of system components. In some embodiments, the control system 130 receives plant treatment instructions that dictate certain operations of system components. The control system 130 can receive information from and/or provide input to the detection mechanism 110, the verification mechanism 150, and the treatment mechanism 120. The control system 130 can be automated or can be operated by a user. In some embodiments, the control system 130 may be configured to control operating parameters of the farming machine 100 (e.g., speed, direction). The control system 130 also controls operating parameters of the detection mechanism 110. Operating parameters of the detection mechanism 110 may include processing time, location and/or angle of the detection mechanism 110, image capture intervals, image capture settings, etc. The control system 130 can also control operating parameters of the treatment mechanism 120. Operating parameters of the treatment mechanism 120 may include positioning of one or more components of the treatment mechanism 120 and actuation of the treatment mechanism 120. The control system 130 may be a computer, as described in greater detail below in relation to FIG. 9.

The control system 130 may be coupled to the farming machine 100 such that a user (e.g., a driver) can interact with the control system 130. In other embodiments, the control system 130 is physically removed from the farming machine 100 and communicates with system components (e.g., detection mechanism 110, treatment mechanism 120, etc.) wirelessly. In some embodiments, the control system 130 is an umbrella term that includes multiple networked systems distributed across different locations (e.g., a system on the farming machine 100 and a system at a remote location). In some embodiments, one or more processes are performed by another control system. For example, the control system 130 may receive plant treatment instructions from another control system.

In some configurations, the farming machine 100 includes a mounting mechanism 140 that functions to provide a mounting point for the system components. In one example, the mounting mechanism 140 statically retains and mechanically supports the positions of the detection mechanism 110, the treatment mechanism 120, and the verification mechanism 150 relative to a longitudinal axis of the mounting mechanism 140. The mounting mechanism 140 is a chassis or frame but can alternatively be any other suitable mounting mechanism. In the embodiment of FIGS. 1A-1C, the mounting mechanism 140 extends outward from a body of the farming machine 100 in the positive and negative y-direction (in the illustrated orientation of FIGS. 1A-1C) such that the mounting mechanism 140 is approximately perpendicular to the direction of travel 115. The mounting mechanism 140 in FIGS. 1A-1C includes an array of treatment mechanisms 120 positioned laterally along the mounting mechanism 140. In alternate configurations, there may be no mounting mechanism 140, the mounting mechanism 140 may be alternatively positioned, or the mounting mechanism 140 may be incorporated into any other component of the farming machine 100.

The farming machine 100 includes a first set of coaxial wheels and a second set of coaxial wheels, wherein the rotational axis of the second set of wheels is parallel with the rotational axis of the first set of wheels. In some embodiments, each wheel in each set is arranged along an opposing side of the mounting mechanism 140 such that the rotational axes of the wheels are approximately perpendicular to the mounting mechanism 140. In FIGS. 1A-1C, the rotational axes of the wheels are approximately parallel to the mounting mechanism 140. In alternative embodiments, the system can include any suitable number of wheels in any suitable configuration. The farming machine 100 may also include a coupling mechanism 142, such as a hitch, that functions to removably or statically couple to a drive mechanism, such as a tractor, more to the rear of the drive mechanism (such that the farming machine 100 is dragged behind the drive mechanism), but can alternatively be attached to the front of the drive mechanism or to the side of the drive mechanism. Alternatively, the farming machine 100 can include the drive mechanism (e.g., a motor and drive train coupled to the first and/or second set of wheels). In other example systems, the system may have any other means of traversing through the field.

In some configurations, the farming machine 100 additionally includes a verification mechanism 150 that functions to record a measurement of the ambient environment of the farming machine 100. The farming machine may use the measurement to verify or determine the extent of plant treatment. The verification mechanism 150 records a measurement of the geographic area previously measured by the detection mechanism 110. The verification mechanism 150 records a measurement of the geographic region encompassing the plant treated by the treatment mechanism 120. The verification mechanism 150 measurement can additionally be used to empirically determine (e.g., calibrate) treatment mechanism operation parameters to obtain the desired treatment effect. The verification mechanism 150 can be substantially similar (e.g., be the same type of mechanism as) to the detection mechanism 110 or can be different from the detection mechanism 110. In some embodiments, the verification mechanism 150 is arranged distal the detection mechanism 110 relative the direction of travel, with the treatment mechanism 120 arranged there between, such that the verification mechanism 150 traverses over the geographic location after treatment mechanism 120 traversal.

However, the mounting mechanism 140 can retain the relative positions of the system components in any other suitable configuration. In other configurations of the farming machine 100, the verification mechanism 150 can be included in other components of the system.

In some configurations, the farming machine 100 may additionally include a power source, which functions to power the system components, including the detection mechanism 110, control system 130, and treatment mechanism 120. The power source can be mounted to the mounting mechanism 140, can be removably coupled to the mounting mechanism 140, or can be separate from the system (e.g., located on the drive mechanism). The power source can be a rechargeable power source (e.g., a set of rechargeable batteries), an energy harvesting power source (e.g., a solar system), a fuel consuming power source (e.g., a set of fuel cells or an internal combustion system), or any other suitable power source. In other configurations, the power source can be incorporated into any other component of the farming machine 100.

In some configurations, the farming machine 100 may additionally include a communication apparatus, which functions to communicate (e.g., send and/or receive) data between the control system 130 and a set of remote devices. The communication apparatus can be a Wi-Fi communication system, a cellular communication system, a short-range communication system (e.g., Bluetooth, NFC, etc.), or any other suitable communication system.

II. Treatment Mechanism

Figure 2:
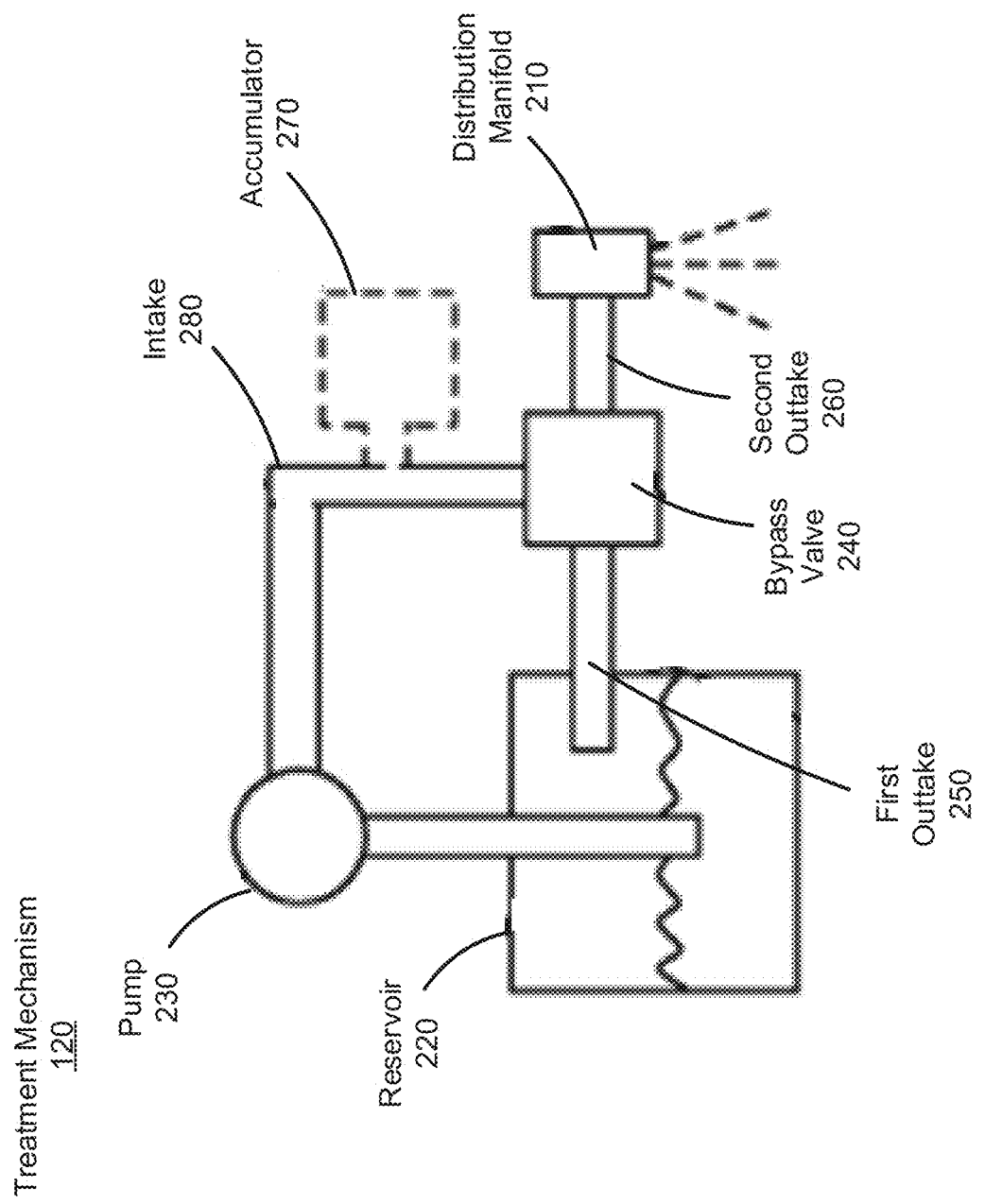
FIG. 2 illustrates the fluidic components and couplings of a treatment mechanism, in accordance with an example embodiment.

FIG. 2 is an illustration of the fluidic components and couplings of a treatment mechanism, in accordance with an example embodiment. The treatment mechanism 120 includes a distribution manifold 210, a reservoir 220, a pump 230, a bypass valve 240, a first outtake 250, a second outtake 260, and an intake 280. The treatment mechanism 120 can include additional or fewer components than described herein. For example, the treatment mechanism 120 may include an accumulator 270. Furthermore, the components of the treatment mechanism 120 can have different or additional functions than described below.

The distribution manifold 210 is configured to apply a plant treatment to the treatment area 122. The distribution manifold 210 receives operation instructions from the control system 130. For example, the control system 130 may provide instructions to the distribution manifold 210 that control a mode of operation (e.g., standby mode or treatment mode) of the distribution manifold 210. In a standby mode, the distribution manifold 210 does not spray treatment fluid and in a treatment mode the distribution manifold 210 does spray treatment fluid. In another example, the control system 130 may provide instructions to the distribution manifold 210 that control which components (e.g., nozzles) to use during the treatment mode as described in greater detail in FIG. 7 and FIG. 8.

The treatment fluid can be water, fertilizer, growth hormone, herbicide, fungicide, pesticide, or any other suitable fluid. The treatment fluid may be emitted (e.g., sprayed) at a spray pressure of approximately 40-70 psi, within a margin of error (e.g., a 5% margin of error, 2% margin of error, etc.), but alternatively may be emitted at a pressure of 90 psi or at any other suitable pressure. The spray is emitted from the distribution manifold 210 when positioned within several centimeters (e.g., 1 cm, 5 cm, 10 cm, etc.) of the substrate 106 surface, but can alternatively be positioned a meter away from the substrate 106 surface, or positioned any suitable distance away from the substrate 160 surface.

The operation and components of the distribution manifold 210 are described in greater detail below in relation to FIGS. 3-6.

In the illustrated embodiment of FIG. 2, the treatment mechanism 120 additionally includes the reservoir 220 and the pump 230. The reservoir 220 stores a treatment fluid and the pump 230 actuates movement of the treatment fluid through the components of the treatment mechanism 120. The pump 230 can move fluid from the reservoir 220 using a secondary fluid or a source from the ambient environment (e.g., a fluid source or air), or move the treatment fluid in the reservoir 220 in any other suitable manner.

The bypass valve 240 controls the movement of the treatment fluid throughout the treatment mechanism 120. The bypass valve 240 is operable between a closed mode wherein the bypass valve 240 fluidly disconnects the distribution manifold 210 from the reservoir 220, and an open mode, wherein the bypass valve 240 fluidly connects the distribution manifold 210 to the reservoir 220. In the open mode, the bypass valve 240 fluidly connects the intake 280 to the distribution manifold 210 by disconnecting (e.g., sealing) the intake 280 from the first outtake 250. For example, the pump 230 moves fluid from the reservoir 220 by pumping the treatment fluid into the intake 280, through the bypass valve 240, and through the second outtake 260 to the distribution manifold 210. In the closed mode, the bypass valve 240 disconnects the intake 280 from the distribution manifold 210 by disconnecting (e.g., sealing) the intake 280 from the second outtake 260. For example, the pump 230 moves fluid from the reservoir 220 by pumping the treatment fluid into the intake 280, through the bypass valve 240, and through the first outtake 250 into the reservoir 220.

The bypass valve 240 can be passive, wherein the cracking pressure is the same as the desired spray pressure, or can be active, wherein the bypass valve 240 actuation from the closed to open mode is actively controlled, such as by the control system 130. The bypass valve 240 opens in response to the intake 280 fluid pressure meeting or exceeding a desired spray pressure, such that the intake 280 is fluidly connected to the distribution manifold 210. In this variation, the treatment mechanism 120 can additionally include a pressure sensor or flow sensor that measures the fluid pressure or flowrate at the intake 280, the bypass valve 240, the first outtake 250, the second outtake 260, or the reservoir 220, where the treatment parameters (e.g., initial spray time or position) can be subsequently adjusted or determined based on the measured treatment fluid parameters.

The treatment mechanism 120 can additionally include an accumulator 270 that is fluidly connected to the reservoir 220 and the distribution manifold 210, wherein the pump 230 pumps treatment fluid from the reservoir 220 to the accumulator 270. The accumulator 270 functions to retain a volume of treatment fluid sufficient to dampen pressure changes due to downstream valve actuation. The accumulator 270 can additionally function to pressurize the fluid. In one embodiment, a valve (not shown) may be used to control fluid flow between the accumulator 270 and the distribution manifold 210. In another embodiment, the bypass valve 240 can control fluid flow between the accumulator 270 and the distribution manifold 210. When the bypass valve 240 is used, the accumulator 270 is fluidly connected to the intake 280. The accumulator 270 may be connected in parallel with the distribution manifold 210 but can alternatively be connected in series with the distribution manifold 210. The accumulator 270 can be additionally fluidly connected to a secondary treatment fluid reservoir (not shown), where metered amounts of a secondary treatment fluid (e.g., fertilizer, growth hormone, etc.) can be provided to the accumulator 270 to mix with the primary treatment fluid (e.g., water) from the reservoir 220 within the accumulator 270 prior to being applied to the treatment area 122 via the distribution manifold 210.

The treatment mechanism 120 may contain additional, fewer, or different components then those illustrated in FIG. 2. For example, a treatment mechanism 120 may include a controller that is electronically connected to the control system 130. The controller may control the operation of the distribution manifold 210, the pump 230, the bypass valve 240, and/or any other component of the treatment mechanism 120. For example, the controller may enable or disable the distribution manifold 210 to spray or not spray treatment fluid, may turn on or turn off the pump 230, may open or close the bypass valve, etc.

III. Distribution Manifold Examples

Figure 3A:
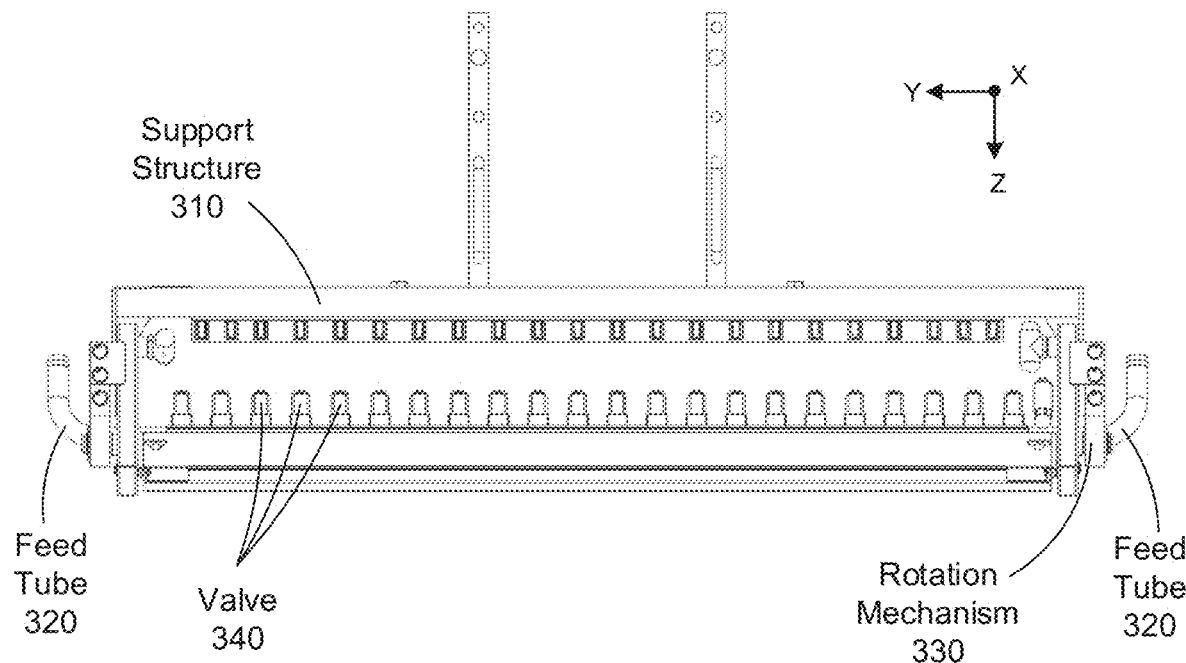
FIG. 3A illustrates a front view of a distribution manifold, in accordance with an example embodiment.
Figure 3B:
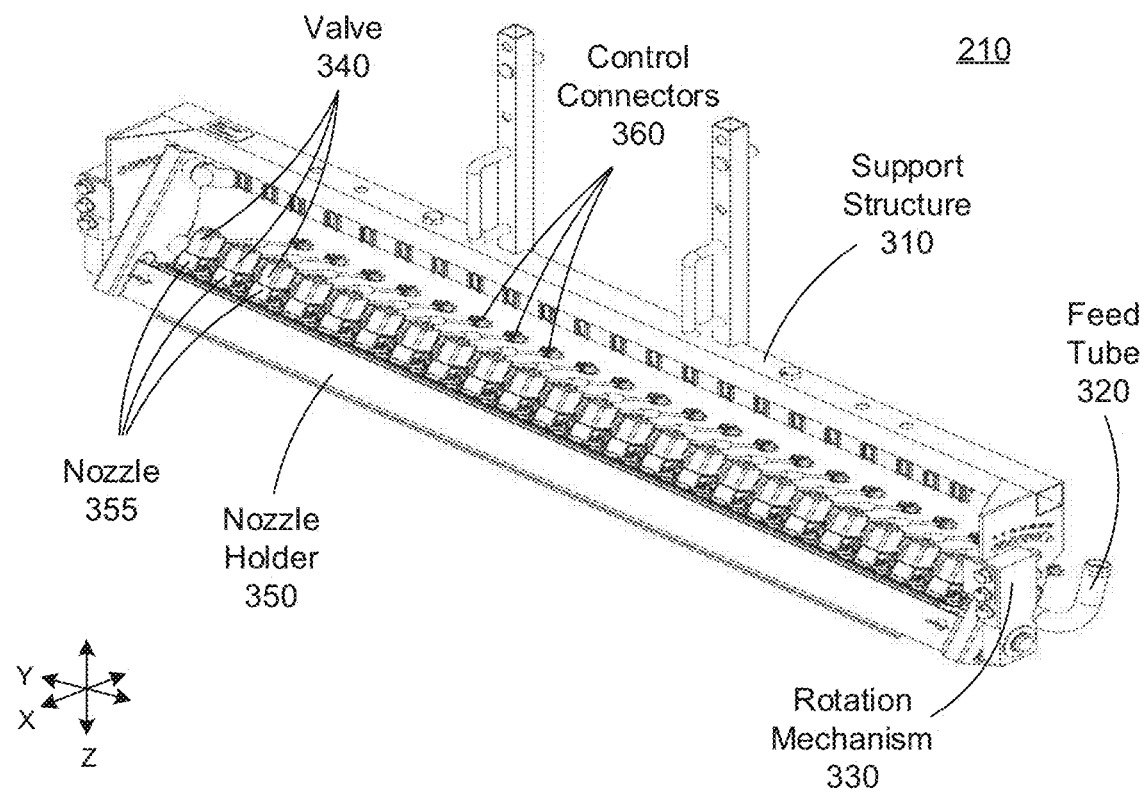
FIG. 3B illustrates an isometric view of the distribution manifold, in accordance with the example embodiment.

FIG. 3A and FIG. 3B, respectively, illustrate a front and isometric view of a distribution manifold of a treatment mechanism, in accordance with an example embodiment. The distribution manifold 210 includes a support structure 310, a feed tube 320, a movement mechanism 330, a plurality of valves 340, a nozzle holder 350, a plurality of nozzles 355, and control connectors 360. The distribution manifold 260 can include additional or fewer components than described herein. Furthermore, the components of the distribution manifold 260 can have different or additional functions than described below.

The support structure 310 is a structural support apparatus configured to mechanically support and couple other components of the distribution manifold 210. The support structure 310 may be created from a mechanically rigid material such as steel, plastic, or any other material that can be used to fabricate chemically compatible components for applying treatment fluid in a field. In some embodiments, the support structure 310 contains a hollow cavity that the feed tube 320 sits inside of and treatment fluid flows inside the feed tube 320 within the support structure 310. In alternative embodiments, the feed tube 320 sits on the outside of the support structure 310. In the illustrated embodiment, the distribution manifold 210 includes a feed tube 320 mechanically coupled to the left and right side of the support structure 310 but can be coupled in any other position. The feed tube 320 is fluidically connected to the plurality of valves 340 and fluidically connected to the reservoir 220. For example, the feed tube 320 can be fluidically coupled to the bypass valve 240 via the second outtake 260. The feed tube 320 can be constructed from plastic, aluminum, steel, or any other tubing material that can be used to fluidically couple components of the distribution manifold assembly 210.

The support structure 310 is coupled to the movement mechanism 330, which, in turn, is coupled to the nozzle holder 350. The movement mechanism 330 is a device that imparts motion on another object. The motion may be a rotational motion and/or a translational motion. In one example, the movement mechanism 330 may be a motor. The movement mechanism 330 is communicatively coupled to the control system 130 and can receive instructions from the control system 130 to adjust the positioning of the nozzle holder 350. In one example, the control system 130 may receive plant treatment instructions that specify the nozzle holder treatment position. The control system 130 determines, based on the plant treatment instructions and current positioning of the nozzle holder(s), that the nozzle holder 350 needs to be adjusted (rotated and/or translated) accordingly. This procedure is described in greater detail below in relation to FIG. 7 and FIG. 8. In another example, the control system 130 may determine one or more nozzles 355 are inoperable (e.g., blocked, clogged, or worn-out) via signals provided by one or more pressure sensors and/or by one or more flow rate sensors. In another example, the control system 130 may determine one or more nozzles 355 are inoperable based on images captured by one or more cameras. The control system 130 determines, based on the one or more nozzles 355 being inoperable, to provide instructions to the movement mechanism 330 to adjust the nozzle holder 350 to align a different set of nozzles 355 below the valves 340.

The nozzle holder 350 is a structural support apparatus configured to mechanically support a plurality of nozzles 355. The nozzle holder 350 may support any number of nozzles 355. In some embodiments, the nozzles 355 may be arranged in a single row or single column on the nozzle holder 350. In some embodiments, the nozzles 355 may be arranged in a grid pattern on the nozzle holder 350. In some embodiments, the nozzles 355 may be arranged in a circular pattern. In the illustrated embodiment, the distribution manifold 210 includes one nozzle holder 350. In alternative embodiments, a distribution manifold 210 may include a plurality of nozzle holders. Each nozzle holder of the plurality may be coupled to a corresponding movement mechanism 330.

In the illustrated embodiment, the plurality of nozzles 355 are arranged in rows (in the y-direction) and columns (in the x-direction). The movement mechanism 330 may receive instructions to rotate the nozzle holder 350 relative to an axis parallel to the field and perpendicular to the direction of travel across the field (e.g., the nozzle holder 350 can rotate around an axis substantially parallel to the y axis). During the rotation of the nozzle holder 350 by the movement mechanism 330, a new row of nozzles 355 may be aligned below the valves 340. In alternative embodiments, the rotation mechanism 330 may translate the nozzle holder 355 relative to an axis parallel to the field and perpendicular to the direction of travel across the field (e.g., the nozzle holder 350 moves in the positive or negative y-direction). In alternative embodiments, the rotation mechanism 330 may translate the nozzle holder 355 relative to an axis parallel to the field and parallel to the direction of travel across the field (e.g., the nozzle holder 350 moves in the positive or negative x-direction). In alternative embodiments, the rotation mechanism 330 may rotate the nozzle holder 355 relative to an axis perpendicular to the field and perpendicular to the direction of travel across the field (e.g., the nozzle holder can rotate around an axis substantially parallel to the z axis). In alternative embodiments, the movement mechanism 330 may both rotate and translate the nozzle holder 350 such that a new row of nozzles 355 are aligned below the valves 340. In the alternative embodiments, a new row of nozzles 355 may be aligned below the valves 340 following the rotations and/or translations of the nozzle holder 350.

Each nozzle 355 may affect how the treatment fluid exits the nozzle 355. For example, each nozzle 355 may affect a set of characteristics including a spray pattern, a droplet size, a flow rate, and an orientation of the treatment fluid exiting the nozzle 355. The spray pattern is a stream of droplets, but can alternatively be a hollow cone, full cone, wide column, fan, flat spray, mist or any other suitable spray pattern for applying treatment fluid to plants 102 in a field. A nozzle 355 can be a single-fluid nozzle but can alternatively be a multiple-fluid nozzle. A nozzle 355 may include one or more orifices where the treatment fluid exits the nozzle. The orifices may be of various sizes. The nozzle 355 can be a plain-orifice nozzle, a shaped-orifice nozzle, a surface-impingement single-fluid nozzle, a pressure-swirl single-fluid spray nozzle, a solid-cone single-fluid nozzle, a compound nozzle, an internal mix two-fluid nozzle, external-mix two-fluid nozzle, or any other suitable nozzle. A nozzle 355 can have a fixed exit or an actuatable exit such that the spray pattern and/or droplet size is configurable. Nozzle emission (e.g., nozzle spray) is controlled by the valves 240, but can alternatively be controlled by any other suitable control mechanism (e.g., the control system 130).

In the illustrated embodiment, the valves 340 are aligned in a row (in the y-direction) above the nozzles 355 (in the x-direction). In alternative embodiments, the valves 340 may be aligned in rows and columns (in the y-direction and the x-direction). During the treatment mode of the distribution manifold 210 some or all of the valves 340 are coupled to a respective nozzle 355 (e.g., a nozzle 355 aligned directly below a corresponding valve 340). In an example embodiment, the valves 340 may be solenoid valves which, when electrically energized allow fluid to flow. The valves 340 may be communicatively coupled to the control system 130 via the control connectors 360. In some embodiments, the valves 340 include a flow rate sensor and/or a pressure sensor. The flow rate sensor may provide a flow rate signal via the control connectors 360 to the control system 130. The flow rate signal may describe how quickly treatment fluid is moving through the valve 340 during a treatment mode of operation. The pressure sensor may provide a pressure signal via the control connectors 360 to the control system 130. The pressure signal may describe a pressure level within the valve 340 during a treatment mode of operation. In some embodiments, the control connectors 360 receive machine commands via the control system 130 and actuate the valves 340 in response. The control system 130 provides instructions to the valves 340 that control actuation of the treatment fluid through the valves 340.

Figure 4A:
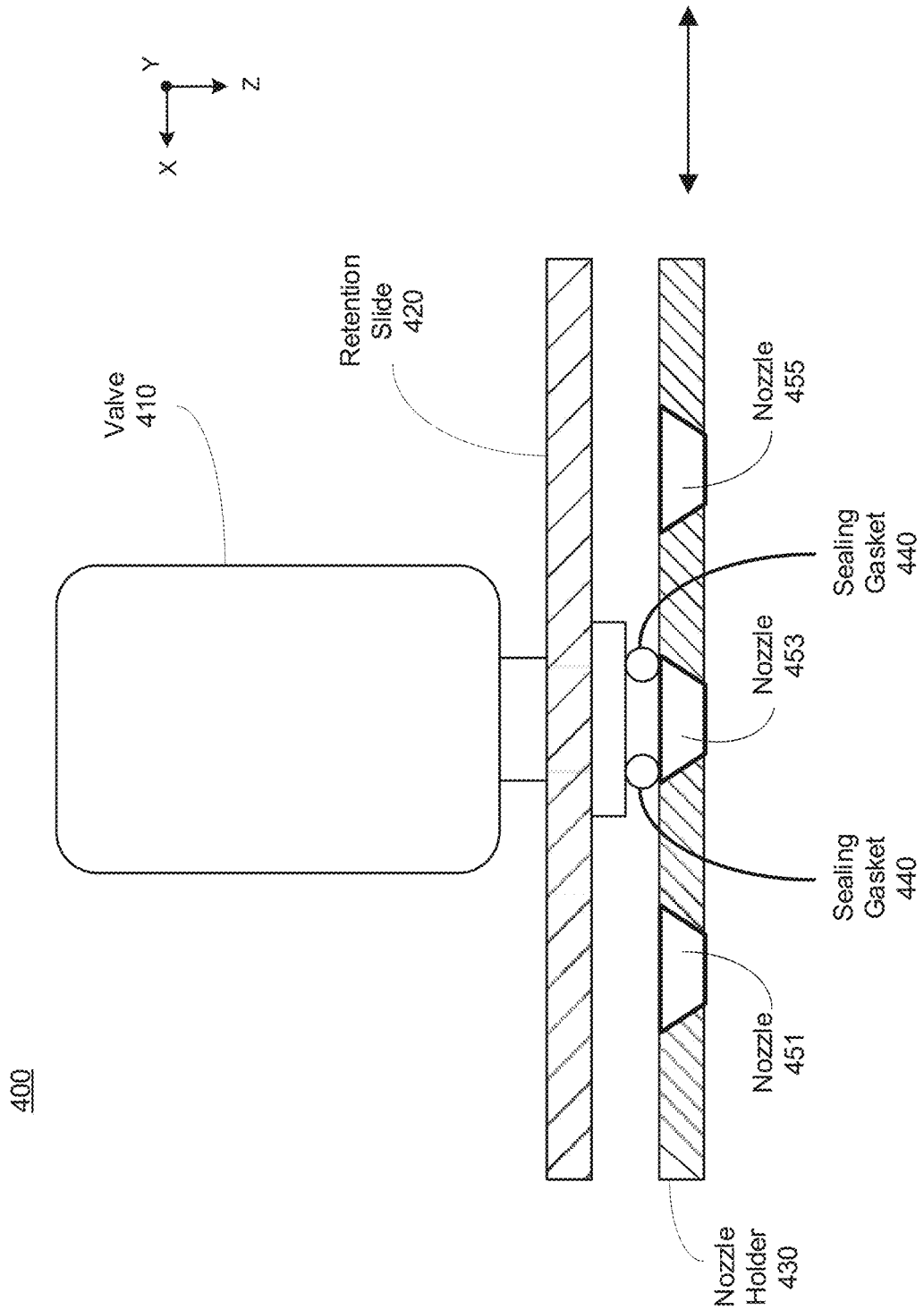
FIG. 4A illustrates a side view of a distribution manifold, in accordance with a second example embodiment.
Figure 4B:
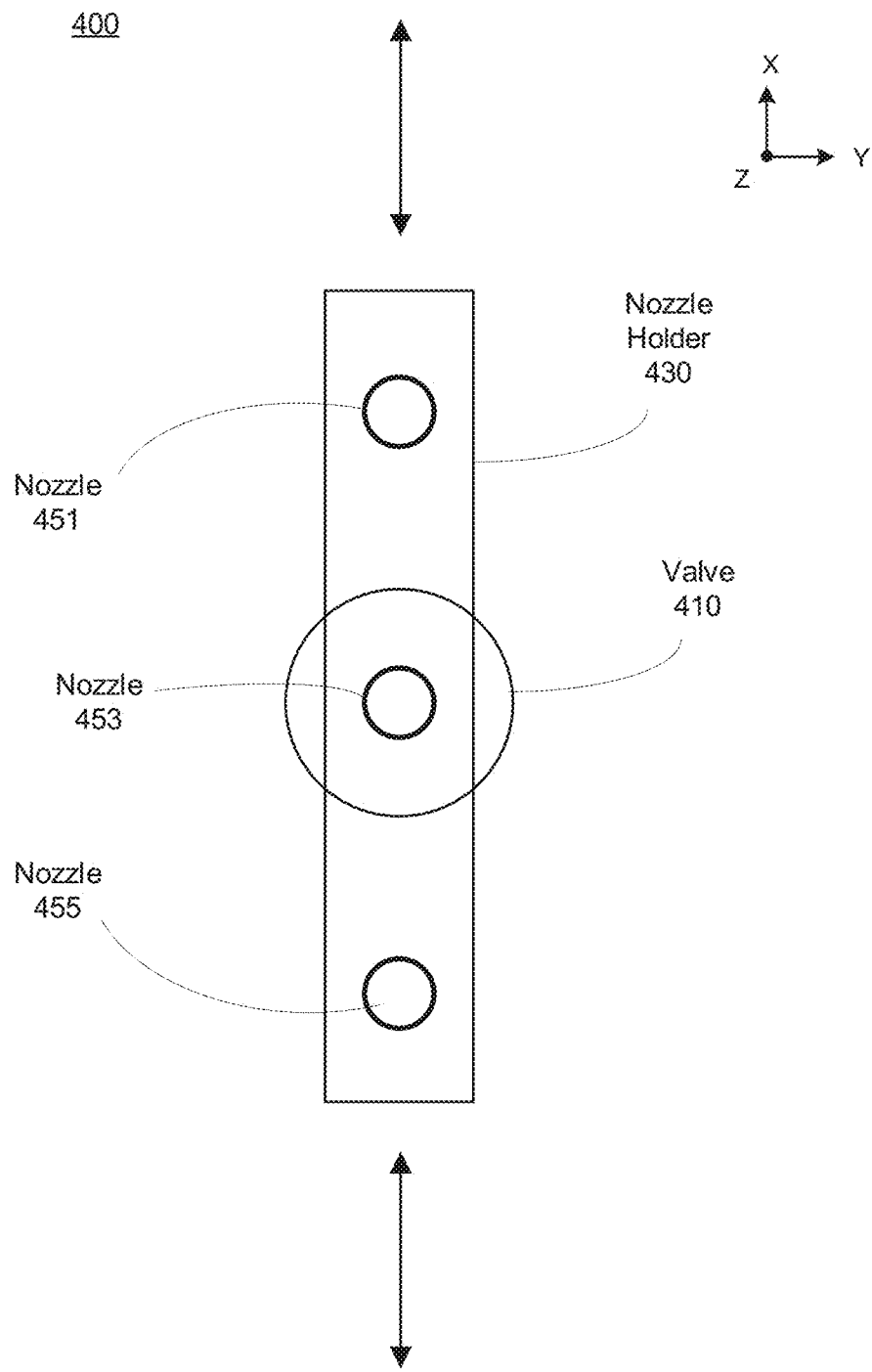
FIG. 4B illustrates a top view of the distribution manifold, in accordance with the second example embodiment.

FIG. 4A and FIG. 4B, respectively, illustrate a side view and a top view of an example distribution manifold, in accordance with a second example embodiment. The distribution manifold 400 includes a valve 410, retention slide 420, a nozzle holder 430, sealing gaskets 440, and a plurality of nozzles (e.g., nozzle 451, nozzle 453, and nozzle 455).

The valve 410 may be substantially similar to the valves 340. The valve 410 is configured to control the flow of treatment fluid. The valve 410 may be fluidically connected to a feed tube (not shown) for receiving treatment fluid from the reservoir 220. During a treatment mode, the valve 410 may couple to a nozzle (e.g., nozzle 451, nozzle 453, or nozzle 455) that is aligned below the valve 410 (in the positive z-direction). The operation of the valve 410 is controlled by any suitable control mechanism (e.g., the control system 130). For example, the valve 410 may be communicatively coupled to the control system 130 via one or more control connectors (not shown). The control of the flow of treatment fluid through the valve 410 and in turn through the coupled nozzle 453 by the control system 130 is described in greater detail below in relation to FIG. 7 and FIG. 8. The coupling of the valve 410 to a nozzle is secured via sealing gaskets 440. The sealing gaskets 440 fill the space between the valve 410 and the respective nozzle (e.g., nozzle 453) to prevent leakage from or into the nozzle holder 430 or other components of the distribution manifold 400.

The nozzle holder 430 houses nozzles 451, 453, 455. The nozzle holder 430 may move in a positive or negative x-direction to align a nozzle (currently nozzle 453) with the valve 410. Movement of the nozzle holder 430 relative to the valve 410 is made possible by the retention slide 420 and actuated by the movement mechanism 330 based on instructions received from the control system 130. The retention slide 420 applies a pressure to maintain the seal provided by the sealing gaskets 440. The control of the movement of the nozzle holder 430 by the control system 130 is described in greater detail below in relation to FIG. 7 and FIG. 8.

In some embodiments, each nozzle 451, 453, 455 may produce a unique spray pattern. For example, nozzle 451 may be a fan nozzle, nozzle 453 may be a cone nozzle, and nozzle 455 may be a flat fan nozzle. In alternative embodiments, some or all of the nozzles 451, 453, 455 may produce a same spray pattern. For example, nozzles 451, 453 are fan nozzles and nozzle 455 is a cone nozzle.

Figure 5A:
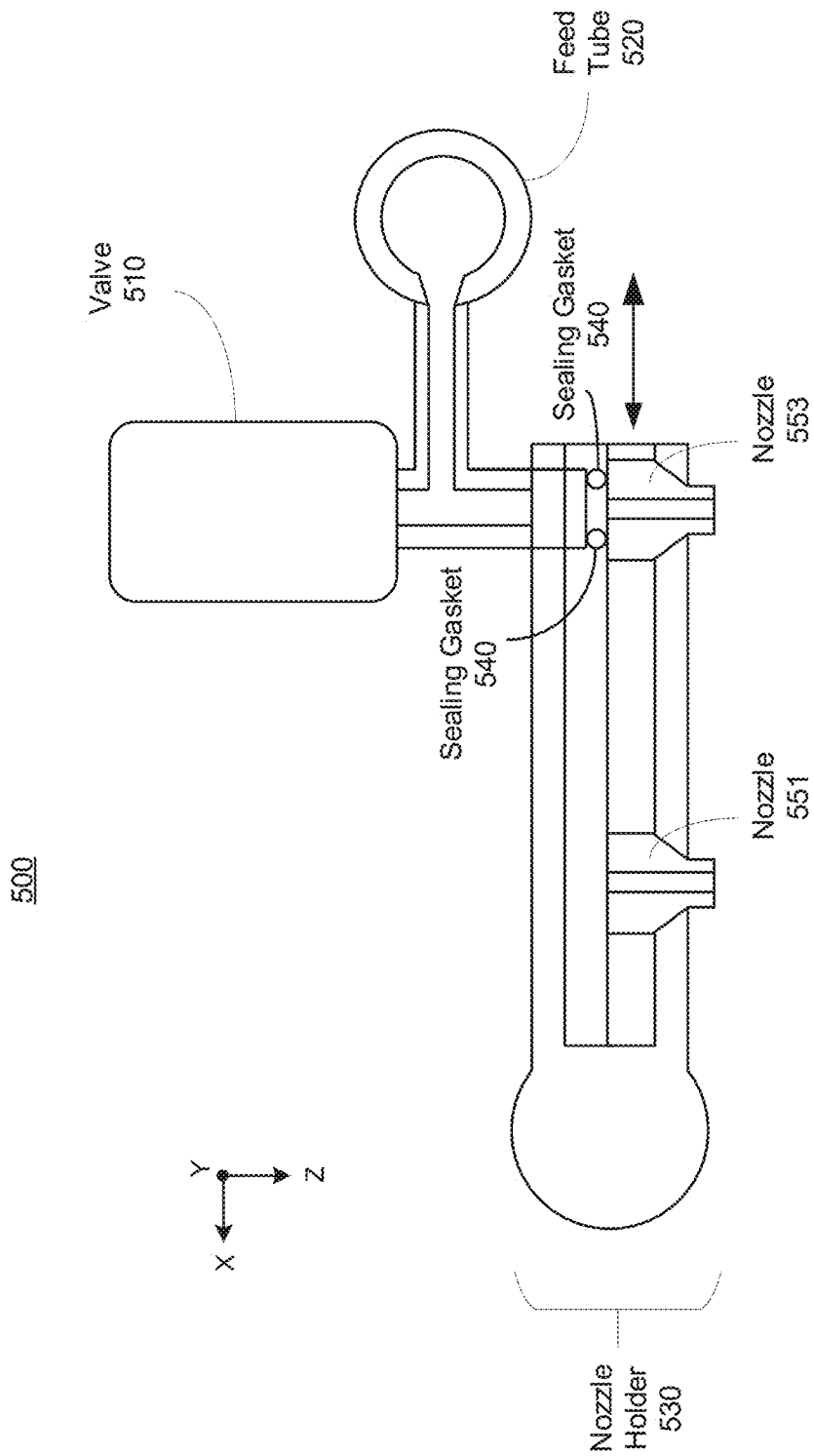
FIG. 5A illustrates a side view of a distribution manifold, in accordance with a third example embodiment.
Figure 5B:
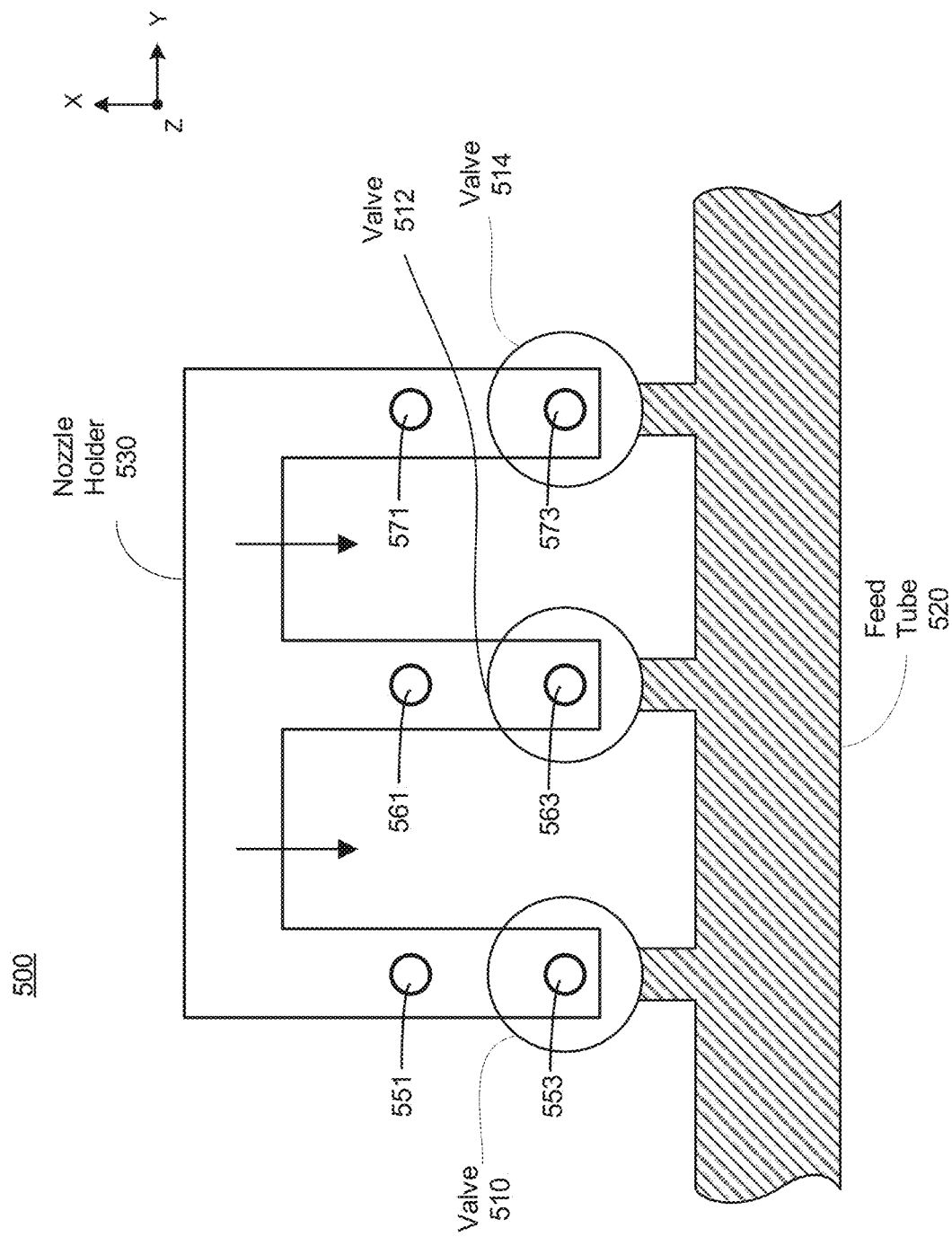
FIG. 5B illustrates a top view of the distribution manifold, in accordance with the third example embodiment.

FIG. 5A and FIG. 5B, respectively, illustrate a top view and a side view, respectively, of an example distribution manifold, in accordance with a third example embodiment. The manifold assembly 500 is substantially similar to the manifold assembly 400 as described in FIGS. 4A and 4B. The distribution manifold 500 includes a plurality of valves (e.g., valves 510, 512, 514), a nozzle holder 530, sealing gaskets 540, and a plurality of nozzles (e.g., nozzle 551, nozzle 553, nozzle 561, nozzle 563, nozzle 571, and nozzle 573).

The valves 510, 512, 514 are configured to control the flow of treatment fluid. The valves 510, 512, 514 are fluidically connected to a feed tube 520. The feed tube 520 is substantially similar to the feed tube 320 as described in FIG. 3A and FIG. 3B. During a treatment mode, the valves 510, 512, 514 may couple to a corresponding nozzle that is aligned below each valve (in the positive z-direction). For example, currently, valve 510 is coupled to nozzle 553, valve 512 is coupled to nozzle 563, and valve 514 is coupled to nozzle 573. The control of the flow of treatment fluid through the valves 510, 512, 514 and in turn through the coupled nozzles 553, 563, 573 is controlled by the control system 130 and is described in greater detail below in relation to FIG. 7 and FIG. 8. The coupling between the valves and the nozzles is secured via a sealing gasket. For example, the coupling between the valve 510 and the nozzle 553 is secured via the sealing gasket 540. The valves 510, 512, 514 are aligned in a row (or a column) in the y-direction.

The nozzle holder 530 comprises a plurality of nozzles arranged in rows and in columns. For example, one column may include nozzles 551, 553 and one row may include nozzles 551, 561, 571. In this illustrated embodiment, the nozzle holder 530 may move in a positive or negative x-direction to align a row that includes multiple nozzles (currently nozzles 553, 563, 573) with the valves 510, 512, 514. Movement of the nozzle holder 530 relative to the valves 510, 512, 514 is controlled by the control system 130 and is described in greater detail below in relation to FIG. 7 and FIG. 8.

In some embodiments of a distribution manifold (not shown), each valve may be associated with a nozzle holder. In some embodiments of a distribution manifold (not shown), a plurality of valves may be associated with a nozzle holder such that by rotating or translating the nozzle holder, the plurality of values may couple to a different nozzle.

In alternative embodiments, the nozzle holder may comprise a plurality of nozzles arranged in a circular configuration. For example, the nozzle holder may rotate around an axis substantially parallel to the z axis to align a nozzle of the plurality of nozzles with a valve. In alternative embodiments, the nozzle holder may move in a positive or negative y direction. Many other embodiments and configurations are also possible.

Figure 6:
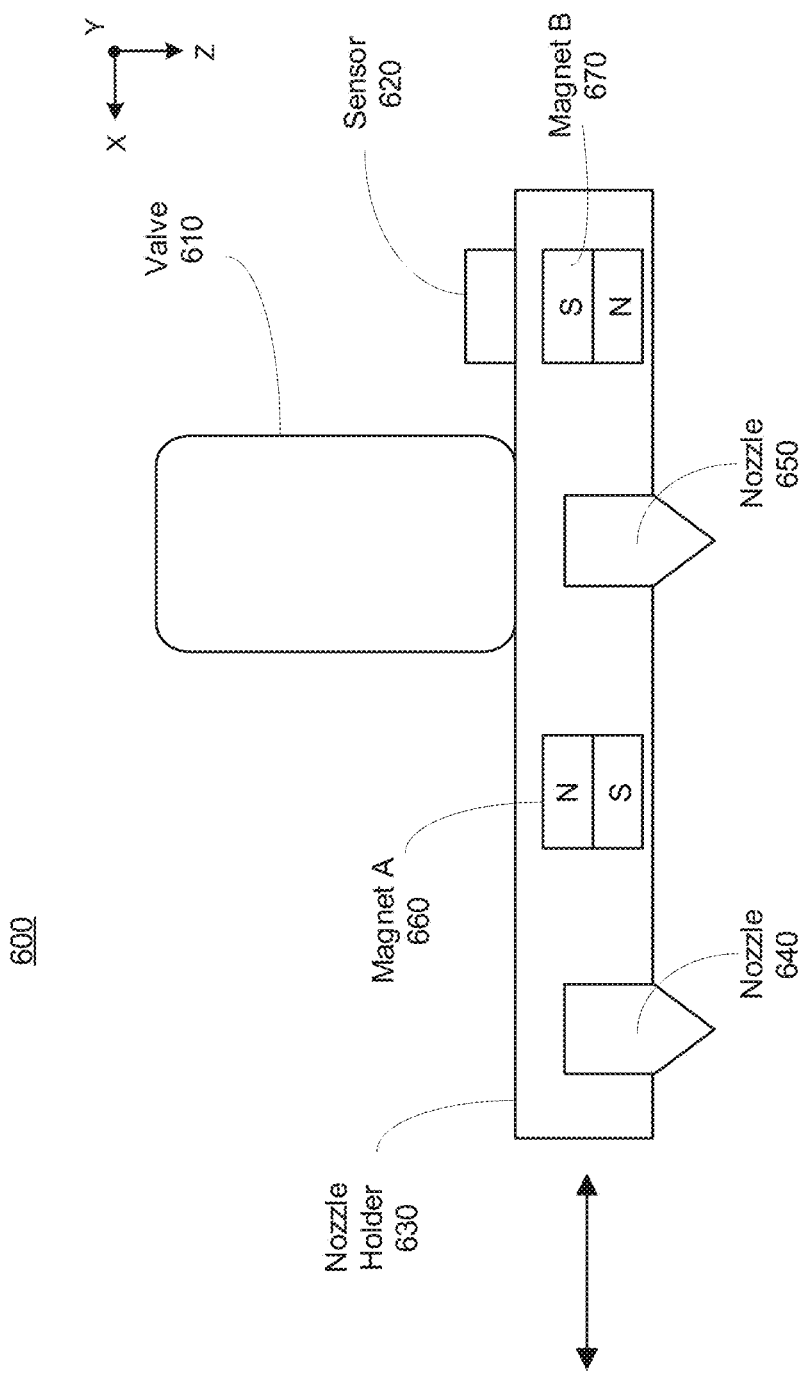
FIG. 6 illustrate a side view of a distribution manifold with sensors, in accordance with an example embodiment.

FIG. 6 illustrates a side view of a distribution manifold with sensors, in accordance with an example embodiment. The distribution manifold 600 is substantially similar to the distribution manifold 400 as described in FIG. 4A and FIG. 4B and the distribution manifold 500 as described in FIG. 5A and FIG. 5B. The distribution manifold 600 includes a valve 610, a sensor 620, a nozzle holder 630, a plurality of nozzles (e.g., nozzle 640 and nozzle 650), and a plurality of magnets (e.g., magnet 660 and magnet 670).

The valve 610 is configured to control the flow of treatment fluid. The valve 610 may be fluidically connected to a feed tube (not shown) for receiving treatment fluid from the reservoir 220. During a treatment mode, the valve 610 may couple to a corresponding nozzle that is aligned below the valve 610 (in the positive z-direction). For example, currently, valve 610 is coupled to nozzle 650. The control of the flow of treatment fluid through the valve 610 and in turn through the coupled nozzle 650 is controlled by the control system 130 and is described in greater detail below in relation to FIG. 7 and FIG. 8. The coupling between the valve and the nozzle may be secured with a sealing gasket (not shown).

In the illustrated embodiment, the nozzle holder 630 comprises a plurality of nozzles (including nozzles 640, 650). The nozzles 640, 650 are arranged in the nozzle holder 630 in a row (or in a column) in the x-direction. The nozzle holder 630 may additionally include a plurality of magnets (e.g., magnet 660 and magnet 670). A unique magnet is placed adjacent to each nozzle in the nozzle holder 630. In the illustrated embodiment, magnet 660 is placed adjacent to nozzle 640 and magnet 670 is placed adjacent to nozzle 650. The magnets may be positioned either to the right or left of their corresponding nozzle. In alternative embodiments, two or more magnets may be placed adjacent to nozzle 640 and nozzle 650. Each magnet 660, 670 produces a unique magnetic field. A stationary sensor 620 measures the unique magnetic fields. In some embodiments, the sensor 620 is Hall-effect sensor. In some embodiments, the sensor 620 is positioned adjacent to the valve 610. In alternative embodiments, more than one sensor 620 may be used to measure the magnetic fields. The sensor 620 is communicatively coupled to the control system 130 and provides measurements to the control system 130 for further analysis. The control system 130 can determine a current position of the nozzle holder 630 and the nozzles 640, 650 based on the magnetic field measurement received from the sensor 620 and determine to adjust the nozzle holder 630 based on the determined positions. This process is described in greater detail below in relation to FIG. 7 and FIG. 8.

In alternative embodiments, magnets may be placed at other known locations on the nozzle holder 630 and/or sensor(s) may be positioned at various known locations on the distribution manifold.

In alternative embodiments of a distribution manifold with sensors, the nozzle holder may comprise a plurality of unique radio frequency identification (RFID) tags. A unique RFID tag may be positioned adjacent to each nozzle. A sensor (e.g., a stationary RFID reader) may read the unique RFID tags. The sensor may be positioned adjacent to the value. The sensor may be communicatively coupled to the control system 130 and provide the unique RFID to the control system 130 for further analysis. The control system 130 can determine a current position of the nozzle holder and the nozzles based on the RFID received from the sensor and determine to adjust the nozzle holder based on the determined position.

In another embodiment of a distribution manifold with sensors, the nozzle holder may comprise color-coded sections. For example, a surface of the nozzle holder adjacent to a nozzle may be color coded a unique color. For example, the surface of the nozzle holder may be colored red adjacent to a first nozzle and colored blue adjacent to a second nozzle. A sensor (e.g., a color sensor) may emit light from a transmitter to the surface of the nozzle holder and detect the light reflected back from the surface with a receiver. The sensor may be positioned adjacent to the valve. The sensor may be communicatively coupled to the control system 130 and provide a light intensity measurement of the reflected light to the control system 130 for further analysis. The control system 130 can determine a current position of the nozzle holder and the nozzles based on the light intensity measurements and determine to adjust the nozzle holder based on the determined position. In another example, a user of the farming machine may inspect the distribution manifold prior to any plants being treated. The user may capture one or more images of the distribution manifold including the color-coded sections using a digital camera and/or a camera on a mobile device (e.g., a smartphone, augmented reality glasses, etc.). The captured images may be provided to the control system 130 and the control system 130 may determine a current position of the nozzle holder and the nozzles based on the captured images.

In alternative embodiments of a distribution manifold with sensors, a sensor (e.g., a camera) may be positioned to capture images of the nozzle holder and/or the nozzles. The sensor provides the captured images to the control system 130 for further analysis. The control system 130 can determine a current position of the nozzle holder and the nozzles based on the captured images and determine to adjust the nozzle holder based on the determined position.

In alternative embodiments of a distribution manifold with sensors, the nozzle holder may comprise electrically conductive sections. For example, a surface of the nozzle holder adjacent to each nozzle may include a unique pattern of electrically conductive material. A probe (sensor) may be positioned adjacent to the valve such that contact with electrically conductive material closes a circuit. The control system 130 can determine a current position of the nozzle holder and the nozzles based on an evaluation of which circuit is closed. In some embodiments, ferrous materials may be incorporated into the nozzle holder at various known locations (e.g., adjacent to each nozzle) and may be sensed by the probe or another type of electro-magnetic sensor.

In alternative embodiments of a distribution manifold with sensors, the nozzle holder may comprise a unique barcode located at known positions on the nozzle holder. For example, a surface of the nozzle holder adjacent to each nozzle may include a unique barcode. A sensor (e.g., barcode scanner) may be positioned adjacent to the valve such that the sensor can read the barcode(s). The sensor provides the readings to the control system 130 for further analysis. The control system 130 can determine a current position of the nozzle holder and the nozzles based on the readings and determine to adjust the nozzle holder based on the determined position.

IV. System Environment

Figure 7:
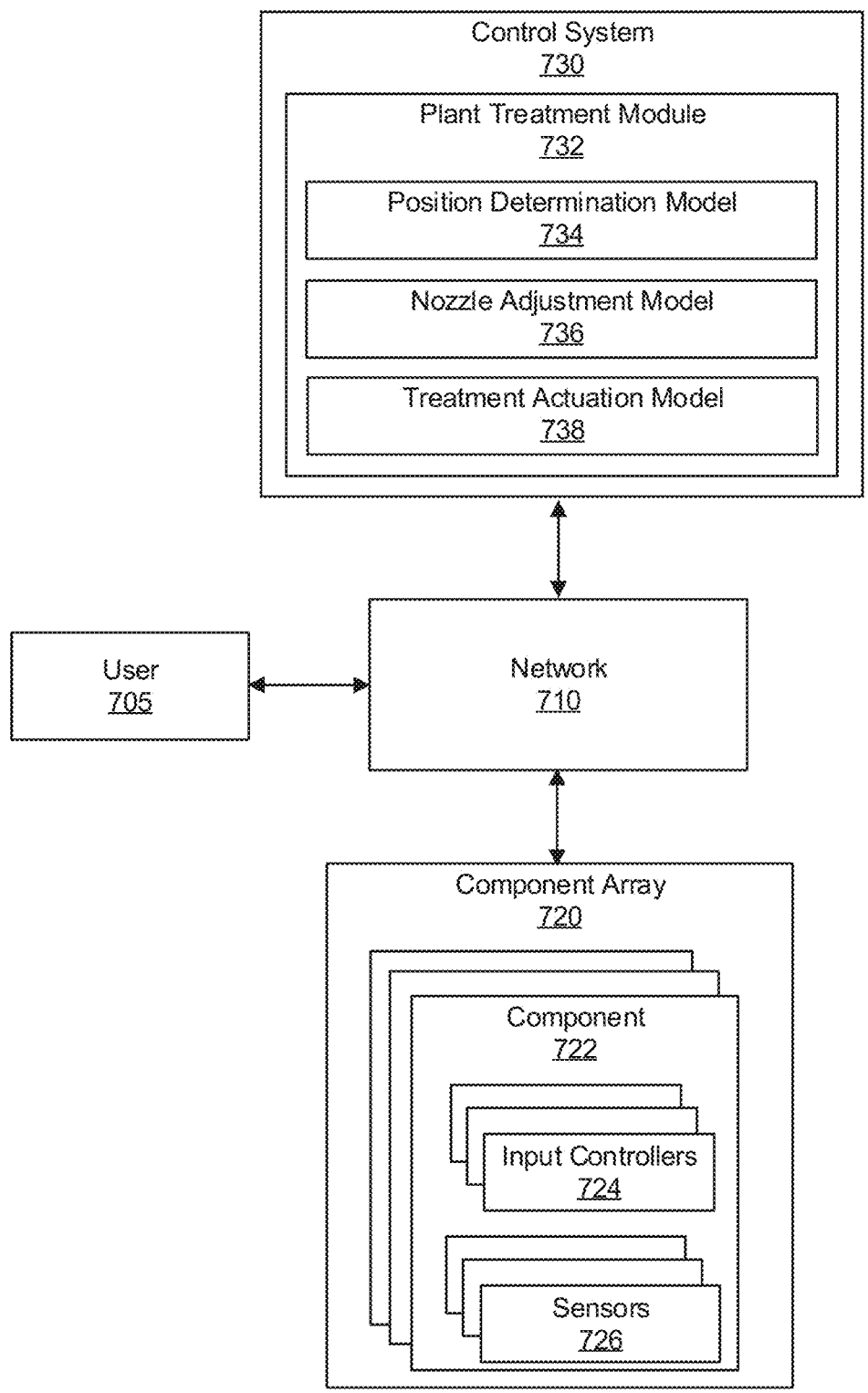
FIG. 7 is a block diagram of the system environment for the farming machine, in accordance with one or more example embodiments.

FIG. 7 is a block diagram of the system environment for the farming machine, in accordance with one or more example embodiments. In this example, the control system 730 is connected to a component array 720 and a user 705 via a network 710 within the system environment 700.

The component array 720 includes one or more components 722. Components 722 are elements of the farming machine that can take farming actions. A component 722 may include a movement mechanism (e.g., the movement mechanism 330) or any other suitable mechanism for rotating and/or translating a nozzle holder (e.g., the nozzle holder 350, the nozzle holder 430, the nozzle holder 530, and the nozzle holder 630). A component 722 may include a valve (e.g., valve 340, valve 410, valves 510, 512, 514, and valve 610) for controlling the flow of treatment fluid. Each component 722 may have one or more input controllers 724 and one or more sensors 726, but a component 722 may include only sensors 726 or only input controllers 724. An input controller 724 controls the function of the component. For example, an input controller 724 may receive machine commands via the network 710 from the control system 730 and actuate the component 722 in response. A sensor 726 generates measurements within the system environment 700. The measurements may be of the component 722, the farming machine 100, or the environment surrounding the farming machine 100. For example, a sensor 726 may measure a configuration or state of the component 722 (e.g., a positioning of the component 722, a pressure within the component 722, etc.), or measure an area surrounding a farming machine 100 (e.g., moisture, temperature, etc.).

The control system 730 receives information from the user 705 and/or the component array 720 and generates farming actions. For example, a user 705 may provide plant treatment instructions to the control system 730. The plant treatment instructions may include a treatment position for a nozzle holder of the plurality of nozzle holders. The treatment position for the nozzle holder is a position of the nozzle holder which enables the farming machine to provide the treatment corresponding to the treatment instruction. That is, in the treatment position the nozzle holder couples a nozzle that will apply the desired treatment to a valve. Additionally, each nozzle in a nozzle holder corresponds to a position of the nozzle holder that couples it to the valve. Each position may be a treatment position when the treatment instruction is for its corresponding nozzle. For example, a first position is associated with a fan nozzle and a second position is associated with a flat spray nozzle. The treatment position is the position associated with the desired nozzle (e.g., the first position with the fan nozzle).

The plant treatment instructions may further include a type of application of treatment fluid and what treatment fluid to apply. The type of application describes how the treatment fluid is to be dispensed. For example, the type of application may include an amount, a spray pattern, a pressure, a flow rate, and/or how far the treatment fluid should be dispensed and may include a broadcast application, a spot spraying application, etc. The spray pattern specifies a resolution of spray width (e.g., a 15" wide spray pattern, a 5" wide spray pattern, etc.), a droplet size, a droplet distribution profile (e.g., even, tapered, conical, etc.), and an angle of distribution. The pressure specifies a speed with which the treatment fluid is dispensed, and the flow rate specifies how much treatment fluid is to be applied. The treatment fluid to apply describes what type of treatment fluid is to be dispensed on the plants. For example, a treatment fluid may include an herbicide, a pesticide, etc.

In one example embodiment, the control system 730 may employ a plant treatment module 732 to adjust a positioning of one or more nozzle holders of a treatment mechanism 120 and actuate the treatment of one or more plants. The plant treatment module 732 includes a position determination model 734, a nozzle adjustment model 736, and a treatment actuation model 738.

As described herein, the position determination model 734 identifies a current position of one or more nozzle holders of the treatment mechanism 120. In some embodiments, the position determination model 734 may determine a position of a nozzle holder by receiving a measurement from a sensor 726 (e.g., sensor 620). For example, the sensor measures a magnetic field produced by a plurality of magnets positioned in the nozzle holder. Each magnet produces a unique magnetic field and each magnet is associated with a particular nozzle on the nozzle holder. For example, the magnet may be associated with a particular position on the nozzle holder (e.g., first position, second position, etc.) or with a particular type of nozzle (e.g., fan nozzle, cone nozzle, etc.). In embodiments, with a sensor 726 (e.g., a Hall effect sensor) located in a known position (e.g., adjacent to a valve) and a unique magnet located adjacent to each nozzle on the nozzle holder, the position determination model 734 can determine a current position of the nozzle holder. In some embodiments, the position determination model 734 determines which nozzle of a plurality of nozzles is currently coupled to the valve based on the received measurements.

The nozzle adjustment model 736 adjusts the positioning of one or more nozzle holders based on the determined current position of the nozzle holders. The nozzle adjustment model 736 provides instructions to one or more movement mechanisms to adjust their corresponding nozzle holders such that the nozzle holder(s) is adjusted from its current position to the treatment position. In some embodiments, the nozzle adjustment model 736 adjusts some but not all nozzle holders. For example, the farming machine may include a plurality of nozzle holders. The plurality of nozzle holders may be divided into two or more groups. The nozzle adjustment model 736 may provide instructions to adjust the positioning of a first group of nozzle holders from the current position to the treatment position and the positioning of a second group of nozzle holders may not be adjusted.

In some embodiments, the nozzle adjustment model 736 determines to adjust the positioning of the nozzle holder based on a nozzle of the plurality of nozzles associated with the nozzle holder being inoperable or unable to dispense treatment fluid (e.g., by being clogged or blocked). For example, the nozzle adjustment model 736 may receive a signal from one or more sensors 726 that measure pressure and/or measure flow rate in certain components 722 of the treatment mechanism (e.g., a valve or a nozzle currently coupled to a valve). The measurements may indicate that a currently coupled nozzle (e.g., a nozzle currently coupled to the valve) is clogged due to a measurement being greater than (or less than) a threshold measurement. As such, the nozzle adjustment model 736 determines to adjust the positioning of the nozzle holder associated with the clogged nozzle from its current position to a different position where a different nozzle is coupled to the valve. In another example, the nozzle adjustment model 736 may receive one or more captured images from one or more sensors 726 (e.g., cameras) that illustrate certain components 722 of the treatment mechanism (e.g., the nozzle currently coupled to the valve). The captured images may indicate that the currently coupled nozzle is clogged (e.g., little to no treatment fluid is dispensed) or worn-out (e.g., amount of dispensed treatment fluid is greater than type of application specified in plant treatment instructions). As such, the nozzle adjustment model 736 determines to adjust the positioning of the nozzle holder associated with the clogged or worn-out nozzle from its current position to a different position where a different nozzle is then coupled to the valve.

The treatment actuation model 738 provides actuation instructions to the component array 720 to begin treating the plants. In some embodiments, the treatment actuation model 738 provides actuation instructions that instruct certain valves (some but not all) to begin dispensing treatment fluid based on the plant treatment instructions. In some embodiments, the treatment actuation model 738 provides actuation instructions that instruct some or all the valves to continuously dispense treatment fluid for a period of time. For example, the plant treatment instructions include a type of application of treatment fluid to be a broadcast application. The treatment actuation model 738 may provide actuation instructions to the component array 720 for the valves to continuously dispense treatment fluid. In some embodiments, the actuation instructions instruct the valves to briefly dispense treatment fluid. For example, the plant treatment instructions include a type of application of treatment fluid to be spot spraying. The treatment actuation model 738 provides actuation instructions to the component array 720 for the valves to dispense treatment fluid for a short period of time. In some embodiments, the treatment actuation model 738 provides actuation instructions that instruct a flow rate for one or more valves. For example, the plant treatment instructions include flow rate for dispensing the treatment fluid. The treatment actuation model 738 provides actuation instructions to the component array 720 to adjust the flow rate accordingly. In some embodiments, the treatment actuation model 738 provides actuation instructions to the component array 720 based on other signals from one or more sensors 726. The signals may include measurements associated with atmospheric pressure, wind, air temperature, velocity of farming machine, etc. In some embodiments, the treatment actuation model 738 may compare the measurements to various threshold measurement values to determine appropriate actuation instructions (e.g., enabling or disabling certain values, flow rate, etc.) to provide to the component array 720.

The network 710 connects nodes of the system environment 700 to allow microcontrollers and devices to communicate with each other. In some embodiments, the components are connected within the network 710 as a Controller Access Network (CAN). In this case, within the CAN each element has an input and output connection, and the CAN may translate information between the various elements. For example, the CAN receives input information from the component array 720, processes the information, and transmits the information to the control system 730. The control system 730 generates a farming action based on the information and transmits instructions to implement the farming action to the appropriate component(s) 722 of the component array 720.

Additionally, the system environment 700 may be other types network environments and include other networks, or a combination of network environments with several networks. For example, the system environment 700, can be a network such as the Internet, a LAN, a MAN, a WAN, a mobile wired or wireless network, a private network, a virtual private network, a direct communication line, and the like.

V. Treating a Plant

Figure 8:
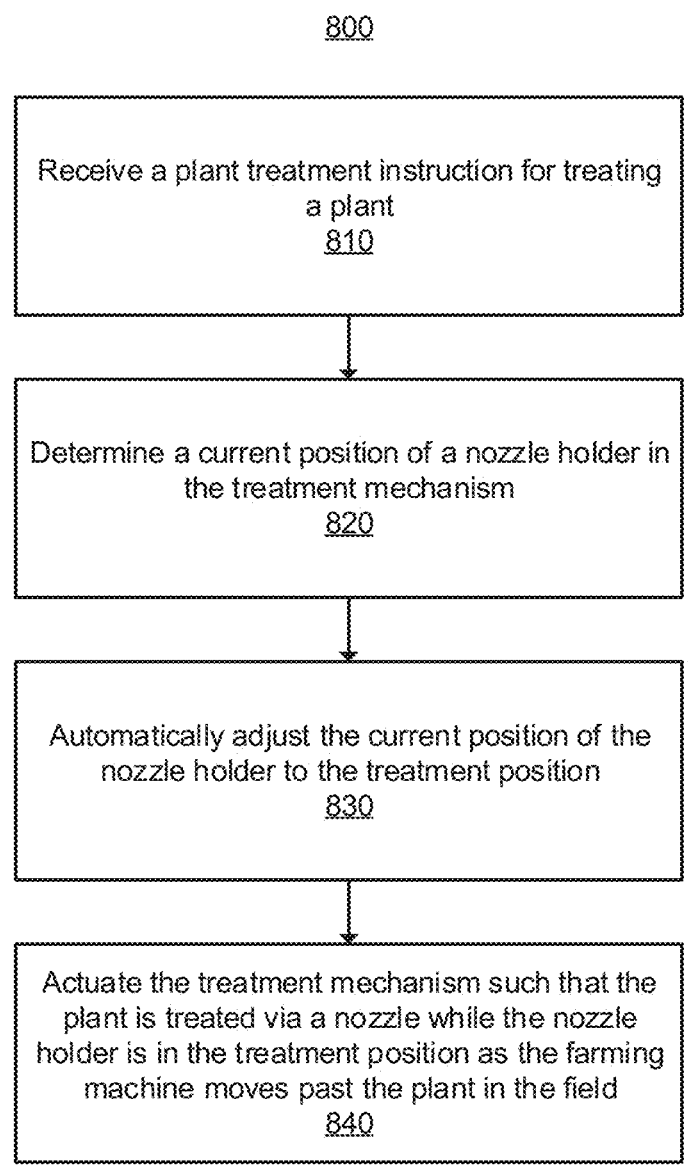
FIG. 8 is a flow chart illustrating a method of treating a plant, in accordance with an example embodiment.

FIG. 8 is a flow chart illustrating a method of treating a plant, in accordance with an example embodiment. The method 800 may be performed from the perspective of the control system 130. The method 800 can include greater or fewer steps than described herein. Additionally, the steps can be performed in different order, or by different components than described herein.

The control system 130 receives 810 a plant treatment instruction for treating a plant. The plant treatment instruction may include a treatment position for a nozzle holder. The treatment position allows a nozzle of a plurality of nozzles included in the nozzle holder to apply a treatment to the plant. The plant treatment instruction may further include a type of application of treatment fluid, what treatment fluid to apply, and a flow rate for dispensing the treatment fluid.

The control system 130 determines 820 a current position of the nozzle holder in the treatment mechanism. To do so, in one embodiment, the control system 130 receives a magnetic field measurement produced by one or more magnets positioned in the nozzle holder. The control system 130 identifies the current position of the nozzle holder based on the measurement of the magnetic field. In some embodiments, the control system 130 may determine which nozzle of the plurality of nozzles is currently coupled to a valve.

The control system 130 automatically adjusts 830 the current position of the nozzle holder to the treatment position such that the nozzle can apply the treatment to the plant. In some embodiments, the control system 130 automatically adjusts the current position of a nozzle holder in a first group of nozzle holders to the treatment position and maintains a current position of other nozzle holders in a second group of nozzle holders. In some embodiments, the control system 130 may determine a nozzle of the plurality of nozzles associated with the nozzle holder is unable to dispense fluid. For example, the control system 130 may receive a pressure measurement from a sensor (e.g., a pressure sensor) at the nozzle and/or at the valve. The control system 130 may automatically adjust the current position of the nozzle holder such that a different nozzle of the plurality of nozzles can apply the treatment to the plant.

The control system 130 actuates 840 the treatment mechanism such that the plant is treated via the nozzle while the nozzle holder is in the treatment position.

VI. Control System

Figure 9:
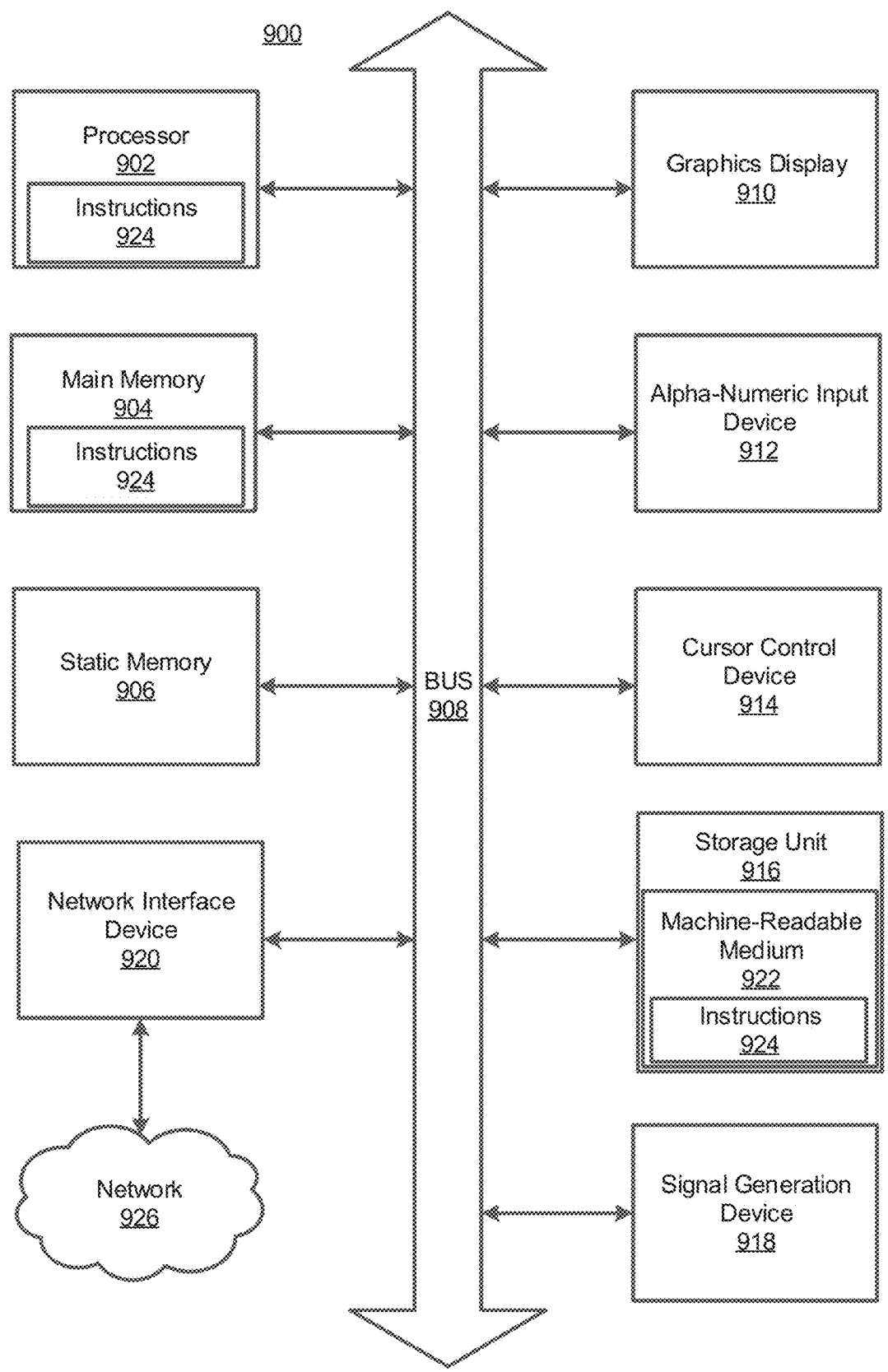
FIG. 9 is a block diagram illustrating components of an example machine for reading and executing instructions from a machine-readable medium, in accordance with one or more example embodiments.

FIG. 9 is a block diagram illustrating components of an example machine for reading and executing instructions from a machine-readable medium. Specifically, FIG. 9 shows a diagrammatic representation of control system 130 in the example form of a computer system 900. The computer system 900 can be used to execute instructions 924 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 924 (sequential or otherwise) that specify actions to be taken by that machine. Further, while only a single machine is illustrated, the term "machine" shall also be taken to include any collection of machines that individually or jointly execute instructions 924 to perform any one or more of the methodologies discussed herein.

The example computer system 900 includes one or more processing units (generally processor 902). The processor 902 is, for example, a central processing unit (CPU), a graphics processing unit (GPU), a digital signal processor (DSP), a control system, a state machine, one or more application specific integrated circuits (ASICs), one or more radio-frequency integrated circuits (RFICs), or any combination of these. The computer system 900 also includes a main memory 904. The computer system may include a storage unit 916. The processor 902, memory 904, and the storage unit 916 communicate via a bus 908.

In addition, the computer system 900 can include a static memory 906, a graphics display 910 (e.g., to drive a plasma display panel (PDP), a liquid crystal display (LCD), or a projector). The computer system 900 may also include alphanumeric input device 912 (e.g., a keyboard), a cursor control device 914 (e.g., a mouse, a trackball, a joystick, a motion sensor, or other pointing instrument), a signal generation device 918 (e.g., a speaker), and a network interface device 920, which also are configured to communicate via the bus 908.

The storage unit 916 includes a machine-readable medium 922 on which is stored instructions 924 (e.g., software) embodying any one or more of the methodologies or functions described herein. For example, the instructions 924 may include the functionalities of modules of the control system 130 described in FIGS. 1A-1C, 7 and 8. The instructions 924 may also reside, completely or at least partially, within the main memory 904 or within the processor 902 (e.g., within a processor's cache memory) during execution thereof by the computer system 900, the main memory 904 and the processor 902 also constituting machine-readable media. The instructions 924 may be transmitted or received over a network 926 via the network interface device 920.

VII. Additional Considerations

In the description above, for purposes of explanation, numerous specific details are set forth in order to provide a thorough understanding of the illustrated system and its operations. It will be apparent, however, to one skilled in the art that the system can be operated without these specific details. In other instances, structures and devices are shown in block diagram form in order to avoid obscuring the system.

Reference in the specification to "one embodiment" or "an embodiment" means that a particular feature, structure, or characteristic described in connection with the embodiment is included in at least one embodiment of the system. The appearances of the phrase "in one embodiment" in various places in the specification are not necessarily all referring to the same embodiment.

Some portions of the detailed descriptions are presented in terms of algorithms or models and symbolic representations of operations on data bits within a computer memory. An algorithm is here, and generally, conceived to be steps leading to a desired result. The steps are those requiring physical transformations or manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some of the operations described herein are performed by a computer physically mounted within a machine. This computer may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of non-transitory computer readable storage medium suitable for storing electronic instructions.

The figures and the description above relate to various embodiments by way of illustration only. It should be noted that from the following discussion, alternative embodiments of the structures and methods disclosed herein will be readily recognized as viable alternatives that may be employed without departing from the principles of what is claimed.

One or more embodiments have been described above, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct physical or electrical contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article or apparatus that comprises a list of elements is not necessarily limited to only those elements but may include other elements not expressly listed or inherent to such process, method, article or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B is true (or present).

In addition, use of the "a" or "an" are employed to describe elements and components of the embodiments herein. This is done merely for convenience and to give a general sense of the system. This description should be read to include one or at least one and the singular also includes the plural unless it is obvious that it is meant otherwise.

Upon reading this disclosure, those of skill in the art will appreciate still additional alternative structural and functional designs for a system and a process for identifying and treating plants with a farming machine including a control system executing a semantic segmentation model. Thus, while particular embodiments and applications have been illustrated and described, it is to be understood that the disclosed embodiments are not limited to the precise construction and components disclosed herein. Various modifications, changes and variations, which will be apparent to those, skilled in the art, may be made in the arrangement, operation and details of the method and apparatus disclosed herein without departing from the spirit and scope defined in the appended claims.

What is claimed is:

1. A method for treating a plant in a field by a farming machine that moves through the field, the farming machine comprising a treatment mechanism for treating the plant in the field, and the treatment mechanism comprising a plurality of nozzle holders with each nozzle holder comprising a plurality of nozzles and each of the nozzles corresponding to a unique magnet having a unique magnetic field, the method comprising:
   receiving a plant treatment instruction for treating the plant, the plant treatment instruction comprising a treatment nozzle of the plurality of nozzles having a treatment position in a nozzle holder of the plurality of nozzle holders, the treatment position allowing the treatment nozzle to apply a treatment to the plant in the field;
   determining a current nozzle of the plurality of nozzles in a current position of the nozzle holder in the treatment mechanism by:
      measuring a unique magnetic field produced by a unique magnet corresponding to the current nozzle, and
      identifying the current nozzle in the current position of the nozzle holder based on the measurement of the unique magnetic field;
   automatically exchanging the current nozzle for the treatment nozzle by adjusting the current position of the nozzle holder to the treatment position such that the treatment nozzle can apply the treatment to the plant in the field; and
   actuating, based on the plant treatment instruction, the treatment mechanism such that the plant is treated via the treatment nozzle while the nozzle holder is in the treatment position as the farming machine moves past the plant in the field.

2. The method of claim 1, wherein the treatment mechanism further comprises a valve, and wherein determining the current position of the nozzle holder in the treatment mechanism further comprises determining which nozzle of the plurality of nozzles is currently coupled to the valve.

3. The method of claim 1, wherein the plurality of nozzle holders are divided into at least a first group of nozzle holders and a second group of nozzles holders, and wherein automatically adjusting the current position of the nozzle holder to the treatment position comprises adjusting the current position of each nozzle holder in the first group of nozzle holders to the treatment position and maintaining a position of each nozzle holder in the second group of nozzle holders.

4. The method of claim 1, wherein the plurality of nozzle holders are divided into a least a first group of nozzle holders and a second group of nozzle holders, and wherein actuating, based on the plant treatment instruction, the treatment mechanism further comprises dispensing fluid from a nozzle of the plurality of nozzles associated with the first group of nozzle holders.

5. The method of claim 1, wherein the plant treatment instruction further comprises a flow rate for the treatment mechanism, and the method further comprising:
   adjusting the flow rate of the treatment mechanism prior to actuating the treatment mechanism.

6. The method of claim 1, wherein the plant is treated via the treatment nozzle with at least one of an herbicide treatment, a pesticide treatment, a fungicide treatment, or a fertilizer treatment.

7. The method of claim 1, wherein the treatment mechanism comprises a valve, and the method further comprising:
   determining the treatment nozzle is unable to dispense fluid; and
   automatically adjusting the nozzle holder such that a different nozzle of the plurality of nozzles can apply the treatment to the plant in the field.

8. The method of claim 1, further comprising:
   capturing, using a detection mechanism, an image of the plant in the field as the farming machine moves through the field;
   identifying, based on the image, the plant in the field; and
   generating the plant treatment instruction for treating the plant.

9. The method of claim 1, further comprising:
   selecting the treatment position for the plant treatment instruction based on spray pattern for each nozzle in the plurality of nozzles.

10. The method of claim 1, further comprising:
    selecting the treatment position for the plant treatment instruction based on droplet size for each nozzle in the plurality of nozzles.

11. The method of claim 1, further comprising:
    selecting the treatment position for the plant treatment instruction based on flow rate for each nozzle in the plurality of nozzles.

12. The method of claim 1, further comprising:
    selecting the treatment position for the plant treatment instruction based on orientation for each nozzle in the plurality of nozzles.

13. The method of claim 1, further comprising:
    selecting the treatment position for the plant treatment instruction based on a treatment type of the treatment.

14. The method of claim 1, further comprising:
    selecting the treatment position for the plant treatment instruction based on a treatment fluid of the treatment.

15. The method of claim 1, further comprising:
selecting the treatment position for the plant treatment instruction based on a type of the plant.

* * * * *